(12) United States Patent
Takayama et al.

(10) Patent No.: US 8,239,484 B2
(45) Date of Patent: *Aug. 7, 2012

(54) INFORMATION TERMINAL

(75) Inventors: Hisashi Takayama, Tokyo (JP); Kyoko Kawaguchi, Tokyo (JP); Yoshiaki Nakanishi, Tokyo (JP); Osamu Sasaki, Tokyo (JP); Atsushi Ando, Kanagawa (JP)

(73) Assignee: Panasonic Corporation, Osaka (JP)

( * ) Notice: Subject to any disclaimer, the term of this patent is extended or adjusted under 35 U.S.C. 154(b) by 41 days.

This patent is subject to a terminal disclaimer.

(21) Appl. No.: 12/610,955

(22) Filed: Nov. 2, 2009

(65) Prior Publication Data

US 2010/0049829 A1 Feb. 25, 2010

Related U.S. Application Data

(62) Division of application No. 11/808,838, filed on Jun. 13, 2007, now Pat. No. 7,627,647, which is a division of application No. 09/958,027, filed on Jan. 7, 2002, now Pat. No. 7,246,152.

(30) Foreign Application Priority Data

Feb. 4, 2000 (JP) .................................. 2000-27973

(51) Int. Cl.
  *G06F 15/16* (2006.01)
(52) U.S. Cl. ........................ 709/217; 709/219
(58) Field of Classification Search .................. 709/203, 709/217, 219, 230, 246; 455/3.06, 414.1, 455/414.2, 556.2, 517
  See application file for complete search history.

(56) References Cited

U.S. PATENT DOCUMENTS

| | | | |
|---|---|---|---|
| 5,442,625 A | 8/1995 | Gitlin et al. | |
| 5,790,800 A | 8/1998 | Gauvin et al. | |
| 5,931,906 A | 8/1999 | Fidelibus et al. | |
| 6,125,384 A * | 9/2000 | Brandt et al. | 709/203 |
| 6,144,990 A * | 11/2000 | Brandt et al. | 709/203 |
| 6,253,326 B1 | 6/2001 | Lincke et al. | |
| 6,343,318 B1 | 1/2002 | Hawkins et al. | |
| 6,397,259 B1 | 5/2002 | Lincke et al. | |
| 6,466,783 B2 | 10/2002 | Dahm et al. | |
| 6,473,609 B1 | 10/2002 | Schwartz et al. | |
| 6,493,758 B1 | 12/2002 | McLain | |
| 6,519,241 B1 | 2/2003 | Theimer | |
| 6,587,835 B1 | 7/2003 | Treyz et al. | |
| 6,590,588 B2 | 7/2003 | Lincke et al. | |

(Continued)

FOREIGN PATENT DOCUMENTS

EP  0 804 045 A2  10/1997

(Continued)

OTHER PUBLICATIONS

Iona Technologies Plc: "Orbix C++ Administrator's Guide", Orbix 3.0.1 Documentation, 'Online! Feb. 1999, XP002301271 <UR::http://www.iona.com/support/docs/manuals/orbix/30/pdf/orbix30_admin.pdf> 'retrieve from internet on Oct. 15, 2004', Chapters 7 and 8.

*Primary Examiner* — Yemane Mesfin
(74) *Attorney, Agent, or Firm* — Browdy and Neimark, PLLC

(57) ABSTRACT

The present invention provides mobile terminals with various types of services such as electronic commerce service, music delivery service, and position information service. User applications required for the electronic commerce service, music delivery service, and position information service are respectively configured as service objects each having a server facility, and further a local gateway is provided, whereby various types of services can be used through a browser.

16 Claims, 17 Drawing Sheets

U.S. PATENT DOCUMENTS

| | | |
|---|---|---|
| 6,594,484 B1 | 7/2003 | Hitchingsa, Jr. |
| 6,721,288 B1 | 4/2004 | King et al. |
| 6,772,952 B1 * | 8/2004 | Macaire .................. 235/492 |
| 6,775,291 B1 | 8/2004 | Ryu et al. |
| 6,829,474 B1 | 12/2004 | Adachi |
| 6,829,484 B1 | 12/2004 | Kimoto et al. |
| 6,874,018 B2 | 3/2005 | Wu |
| 6,901,272 B2 | 5/2005 | Isham |
| 7,574,486 B1 * | 8/2009 | Cheng et al. ............. 709/219 |

FOREIGN PATENT DOCUMENTS

| | | | |
|---|---|---|---|
| EP | 0 950 968 | A1 | 10/1999 |
| EP | 0 973 350 | A2 | 1/2000 |
| EP | 1031922 | A2 | 8/2000 |
| EP | 1 069 539 | A2 | 1/2001 |
| JP | 06-259260 | A | 9/1994 |
| JP | 09-237172 | | 9/1997 |
| JP | 9-237172 | A | 9/1997 |
| JP | 11-122589 | | 4/1999 |
| JP | 11-122589 | A | 4/1999 |
| JP | 11-161602 | | 6/1999 |
| JP | 2000-250838 | A | 9/2000 |
| WO | WO 97/32439 | A2 | 9/1997 |
| WO | WO 97/50263 | A1 | 12/1997 |
| WO | WO99/09502 | | 2/1999 |
| WO | WO 99/37107 | A1 | 7/1999 |

* cited by examiner

FIG.1 PRIOR ART
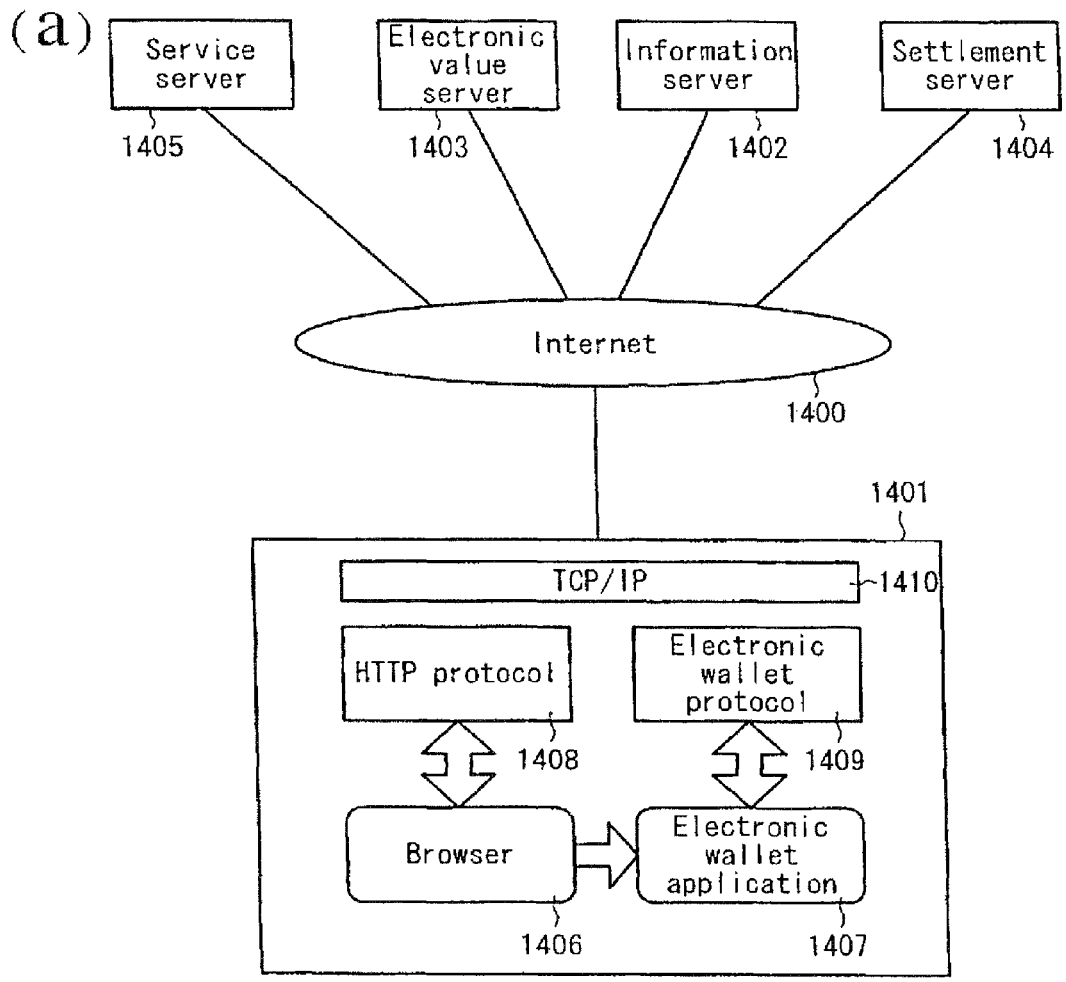
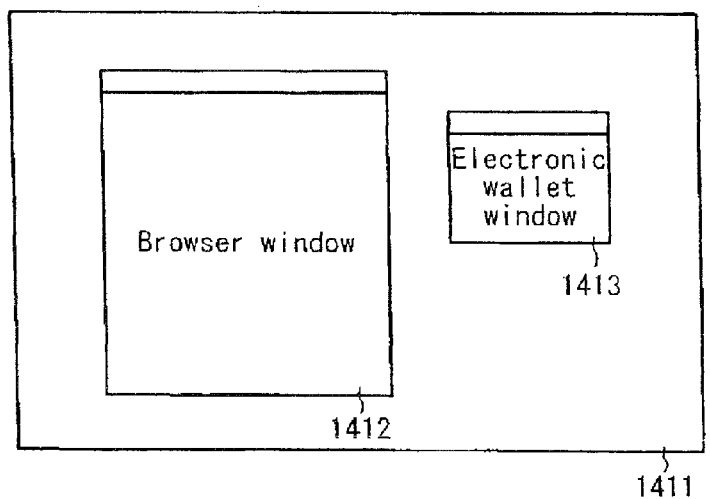

FIG. 8

(a)
My Menu — 702
1 Internet
2 E-Wallet
3 Phone
4 Music Player — 700
5 Navigator
6 Address Book
7 Bookmark
8 Setup
[back] (P) [ok] — 701
200

(b)
Internet
1 News
2 Play Guide
3 Search
4 Enter URL

[back] (P) [ok]

(c)
Internet    Secure
Ticket Order Form

Ticket: Soccer 200X
    Japan vs Brazil
Date: Jun 30 2002 14:00
Stadium: Yokohama
Seat Grade: SS
Price: 200.00USD
Number: ☐

[back] (P) [ok]

(d)
E-Wallet

Enter Password
    ☐

[back] (P) [ok]

(e)
E-Wallet
E-Value | Receipt
1 Prepayed Card-A
2 Prepayed Card-B
3 Airline Ticket
4 Movie Ticket
5 Concert Ticket
6 Soccer 200X Japa
7 Soccer 200X Japa

[back] (P) [next]

(f)
E-Wallet    Secure
Soccer 200X
Japan vs Brazil

Date: 2002/06/30 14:00
Stadium: Yokohama
Seat: SS-A-28

[back] (P) [ok]

(g)
Music Player
Title: Best of Taro S
Artist: Taro Suzuki
1 song for you
2 my love
3 morning
4 tomorrow
5 last night
6 Indian summer

[stop] (P) [play]

(h)
Navigator

— 703

[back] (P) [zoom]

```
<ML version="1.0">
    <CARD name="Server_instruction_1">
        <CENTER><H1>Downloading now !</H1></CENTER>
        <Go HREF="lgw://wallet">
            <postfield name="instruction"  value="fragment DL"/>
            <postfield name="session_id"   value="1234"/>
            <postfield name="num_frag"     value="2"/>
            <postfield name="frag_num"     value="1"/>
            <postfield name="DLserver"     value="http://www.evissuer.com"/>
            <postfield name="DLdata"       value="1234567890abcdefghij1234567890abcdefghij
                                                  :
                                                  :
                                                  :
                    abcdefghij1234567890abcdefghij1234567890abcdefghij1234567890abcdefghij"/>
        </Go>
    </CARD>
</ML>
```
— 1101

(b)

```
<ML version="1.0">
    <CARD name="SO_instruction_1">
        <CENTER><H1>Downloading now !</H1></CENTER>
        <Go HREF=" http://www.evissuer.com ">
            <postfield name="instruction"  value="send_frag"/>
            <postfield name="session_id"   value="1234"/>
            <postfield name="frag_num"     value="2"/>
        </Go>
    </CARD>
</ML>
```
— 1103

```
<ML version="1.0">
    <CARD name="Server_instruction_2">
        <CENTER><H1>Downloading now !</H1></CENTER>
        <Go HREF="lgw.//wallet">
            <postfield name="instruction"  value="fragment DL"/>
            <postfield name="session_id"   value="1234"/>
            <postfield name="num_frag"     value="2"/>
            <postfield name="frag_num"     value="2"/>
            <postfield name="DLserver"     value="http://www.evissuer.com"/>
            <postfield name="DLdata"   value="1234567890abcdefghij1234567890abcdefghij
                                       :
                                       :
                                       :
                    abcdefghij1234567890abcdefghij1234567890abcdefghij1234567890abcdefghij"/>
        </Go>
    </CARD>
</ML>
```
— 1105 (box around postfield block)

(b)

```
<ML version="1.0">
    <CARD name="SO_instruction_2">
        <CENTER><H1>Downloading now !</H1></CENTER>
        <Go HREF=" http://www.evissuer.com ">
            <postfield name="instruction"  value="DLcomplete"/>
            <postfield name="session_id"   value="1234"/>
        </Go>
    </CARD>
</ML>
```
— 1107 (box around postfield block)

FIG.15

```
<ML version="1.0">
    <CARD name="User_Autentication">
        <CENTER><H1>Enter Password</H1></CENTER>
        <input type="passwd" name="pw"/>
        <Do type="ok">
            <Go HREF="Igw://wallet">
                <postfield name="passwd" value="$pw"/>
            </Go>
        </Do>
    </CARD>
</ML>
```

INFORMATION TERMINAL

The present application is a Divisional of application Ser. No. 11/808,838, filed Jun. 13, 2007, which is a Divisional of application Ser. No. 09/958,027 (now U.S. Pat. No. 7,246, 152), filed Jan. 7, 2002, the entirety of which are incorporated by reference herein.

TECHNICAL FIELD

The present invention relates to an information delivery system that provides terminals having a browser with various types of information services such as electronic commerce service, music delivery service, and position information service, and particularly enables the use of various types of services in mobile terminals which are poorer in resources than personal computers.

BACKGROUND ART

In recent years, various types of information services such as retrieval service, electronic commerce service, and music delivery service have been actively offered using a personal computer in which a browser is installed.

For example, electronic commerce service is achieved in a form that installs a browser and an electronic wallet application in a personal computer, and activates the electronic wallet application from the browser to use the facilities of the electronic wallet application. FIG. 1(a) is a schematic block diagram of an EC system of the prior art.

The EC system, as shown in FIG. 1(a), comprises a personal computer in which a browser 1406 and an electronic wallet application 1407 are installed, an electronic value server 1403 that creates and issues electronic value such as electronic tickets and prepaid electronic money, a service server 1405 that provides service corresponding to paid costs, a settlement server 1404 that performs account settlement processing in banks, credit service companies, or settlement institutions, and an information server 1402 that provides online information concerning electronic value and vends electronic value, wherein these components are linked by the Internet 1400.

For example, assuming that information service provided by the service server 1405 is paid by prepaid type electronic money managed by the electronic wallet application 1407, the personal computer 1401 receives HTML page data including a link for activating the electronic wallet application 1407 from the service server 1405 and displays its contents on a browser window 1412 of a display screen 1411 (see FIG. 1(b)). When a user selects the link for activating the electronic wallet application 1407, the browser 1406 activates the electronic wallet application 1407 and an electronic wallet window 1413 is displayed on the display screen 1411. The user manipulates the activated electronic wallet application 1407 and pays a required cost to the service server 1405 by the prepaid type electronic money managed by the electronic wallet application 1407. If the prepaid type electronic money is lacking, the user manipulates the electronic wallet application 1407 to purchase prepaid type electronic money via the information server 1402 and downloads new prepaid type electronic money from the electronic value server 1403. When the required cost is paid, and to ensure security for the downloading of prepaid type electronic money, between the electronic wallet application 1407 and the service server 1406, and between the electronic wallet application 1407 and the electronic value server 1403, communications are performed using an electronic wallet protocol 1409, instead of the HTTP protocol 1408.

However, in an attempt to provide the same services for mobile terminals which have smaller display screens and are poorer in resources such as memory than personal computers, conventional mechanisms have been lacking in the capability to display the browser window and the electronic wallet window on one screen at a time because of the small display screen of the mobile terminals, requiring the mobile terminals to allocate a display memory for each application and providing users with the inconvenience of switching and using screens for each application.

Also, since mobile terminals such as portable telephones, in most cases, have communication parts optimized depending on manufacturers and models, and there is no standard API for the communication parts, it has been necessary to develop an electronic wallet protocol for each model.

Also, in mobile terminals such as portable telephones, since the size of data that can be transferred at a time is smaller, compared with personal computers, large-capacity electronic value containing image data cannot be downloaded and, in some cases, have been unusable in mobile terminals.

DISCLOSURE OF THE INVENTION

The present invention has been made in view of the above circumstances to overcome the above problems and the primary object is to enable mobile terminals to use various types of information services such as electronic commerce service, music delivery service, and position information service.

According to the present invention, there is provided an information terminal, comprising: communication means for providing a facility to communicate with servers on a network; one or more service object means for providing specific information processing facilities; local gateway means for providing a facility to communicate with the service object means; and browser means for providing facilities to browse information written in a markup description language, provided from the servers on the network and the service object means, and present instructions to the servers on the network and the service object means, via the communication means and the local gateway means. By this construction, even mobile terminals can use the facilities of both the servers on the network and the service object means through the browser means, and no display memory needs to be allocated for each application.

BRIEF DESCRIPTION OF THE DRAWINGS

FIG. 1(a) is a schematic block diagram of an EC system of the prior art;

FIG. 1(b) is a schematic diagram illustrating a user's personal computer screen in an EC system of the prior art;

FIG. 8(a) is a schematic diagram of a display screen of a mobile user terminal in accordance with an embodiment of the present invention when turned on;

FIG. 8(b) is a schematic diagram of an Internet menu screen of a mobile user terminal in accordance with an embodiment of the present invention;

FIG. 8(c) is a schematic diagram of an electronic value order screen of a mobile user terminal in accordance with an embodiment of the present invention;

FIG. 8(d) is a schematic diagram of a password input screen of a mobile user terminal in accordance with an embodiment of the present invention;

FIG. 8(e) is a schematic diagram of an electronic value list screen of a mobile user terminal in accordance with an embodiment of the present invention;

FIG. 8(f) is a schematic diagram of an electronic value display screen of a mobile user terminal in accordance with an embodiment of the present invention;

FIG. 8(g) is a schematic diagram of a music player display screen of a mobile user terminal in accordance with an embodiment of the present invention;

FIG. 8(h) is a schematic diagram of a navigator display screen of a mobile user terminal in accordance with an embodiment of the present invention;

FIG. 13(a) is a schematic diagram of Server_instruction_1 message written in a markup description language, in accordance with an embodiment of the present invention;

FIG. 13(b) is a schematic diagram of S0_instruction_1 message written in a markup description language, in accordance with an embodiment of the present invention;

FIG. 14(a) is a schematic diagram of Server_instruction_2 message written in a markup description language, in accordance with an embodiment of the present invention;

FIG. 14(b) is a schematic diagram of S0_instruction_2 message written in a markup description language, in accordance with an embodiment of the present invention;

FIG. 15 is a schematic diagram showing a description example of a markup description language in accordance with an embodiment of the present invention;

PREFERRED EMBODIMENTS OF THE INVENTION

Figure 2:
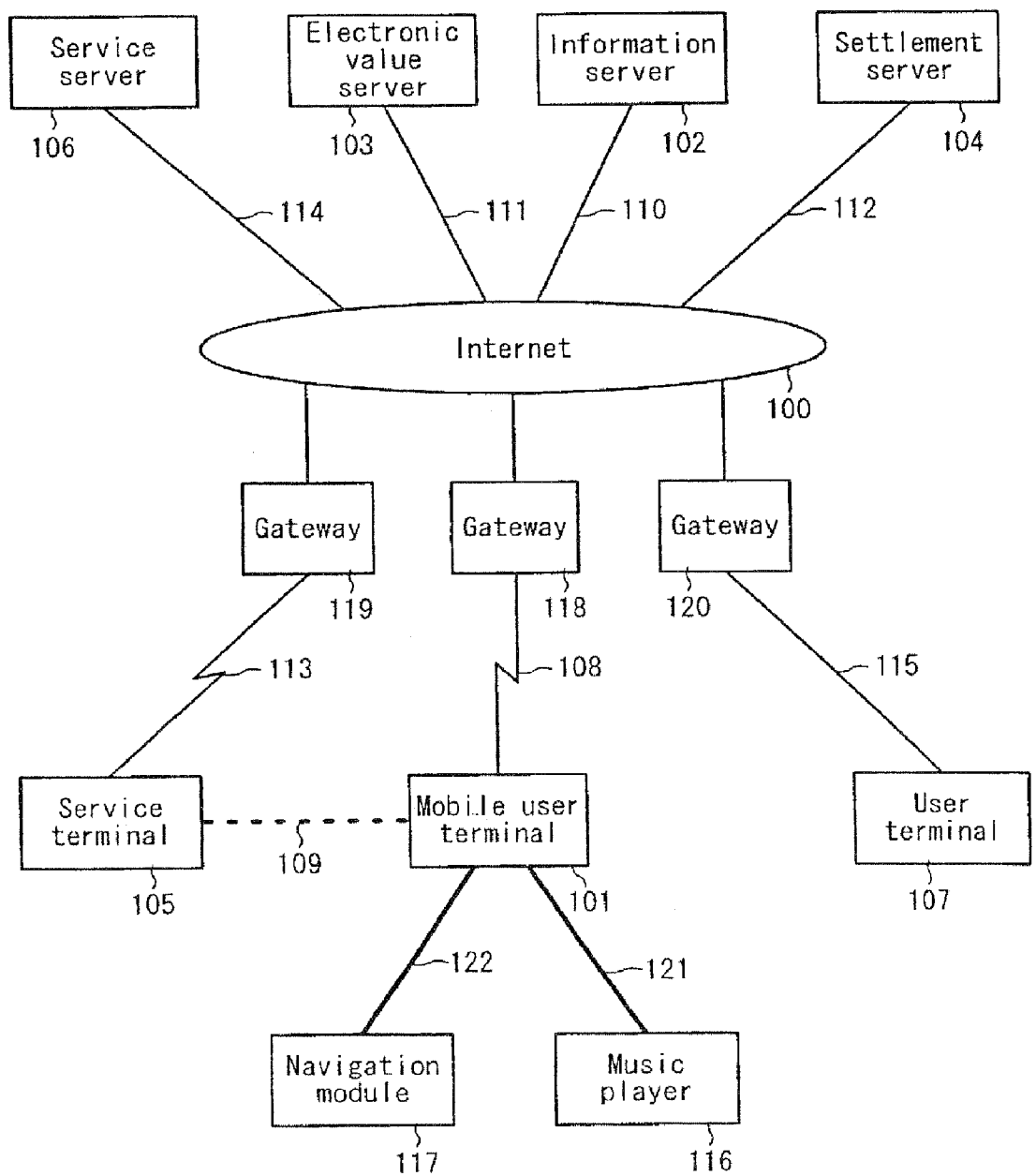
FIG. 2 is a schematic block diagram of a mobile multimedia information delivery system

According to a first aspect of the present invention, an information terminal is provided with: communication means for providing a facility to communicate with servers on a network; one or more service object means for providing specific information processing facilities; local gateway means for providing a facility to communicate with the service object means; and browser means for providing facilities to browse information written in a markup description language, provided from the servers on the network and the service object means, and present instructions to the servers on the network and the service object means, via the communication means and the local gateway means. By this construction, even mobile terminals can use the facilities of both the servers on the network and the service object means through the browser means, and no display memory needs to be allocated for each application.

According to a second aspect of the present invention, the first information terminal is constructed so that the local gateway means has service object manager means for managing the service object means, and the service object manager means, for each service object means, manages URI (Universal Resource Identifier) of a service object, and status information indicating whether the service object is usable. By this construction, by specifying URI of a service object, the facility of a specified service object means can be used.

According to a third aspect of the present invention, the second information terminal is constructed so that the service object manager means has markup description language creating means, and the markup description language creating means creates a list of usable service objects in a markup description language in a format that appends links to the service objects. By this construction, a list of usable service objects can be displayed in the browser means to allow selection of a service object from the browser means, providing increased convenience for users.

According to a fourth aspect of the present invention, the second or third information terminal is constructed so that the service objects have markup description language creating means and exchange a given message with the servers on the network through the browser means by using a method of posting given information to a URI-specified destination of a markup description language. By this construction, without making changes to the communication means, the service objects can be controlled by the servers on the network, and the servers on the network can be controlled by the service objects.

According to a fifth aspect of the present invention, the second or third information terminal is constructed so that the service objects have the markup description language creating means and means for decoding data posted in encoded form, and exchange given data with the servers on the network through the browser means by using a method of posting given information to a URI-specified destination of a markup description language to set encoded data as information to be posted. By this construction, without making changes to the communication means, data can be downloaded to the service objects from the servers on the network, and data can be uploaded to the servers on the network from the service objects.

According to a sixth aspect of the present invention, the fourth or fifth information terminal is constructed so that, in the markup language description from the servers on the network, the service objects are specified by relative identification information, while, in the markup language description from the service objects, the servers on the network are specified by absolute identification information. By this construction, the browser means can easily distinguish between requests from the servers on the network and those from the service objects.

According to a seventh aspect of the present invention, the fifth information terminal is constructed so that the service objects have means for splitting data to be downloaded from the servers on the network to N (an integer greater than 0) pieces of data and downloading it as N markup description languages, and extracts data portions from the received N markup description languages to create one piece of data. By this construction, even in a network over which large data cannot be transmitted at a time, large data can be downloaded.

According to an eighth aspect of the present invention, the seventh information terminal is constructed so that the N markup description languages downloaded from the servers on the network include instruction information indicating how to process them. By this construction, a method of processing downloaded data can be specified in detail.

According to a ninth aspect of the present invention, the seventh or eighth information terminal is constructed so that the N markup description languages downloaded from the servers on the network include identification information indicating that identical data is to be downloaded. By this construction, downloaded data can be correctly converted to one piece of data.

According to a tenth aspect of the present invention, the seventh, eighth, or ninth information terminal is constructed so that the N markup description languages to be downloaded from the servers on the network respectively include identification information indicating their occurrence order. By this construction, downloaded data can be correctly converted to one piece of data.

According to an eleventh aspect of the present invention, the seventh, eighth, ninth, or tenth information terminal is constructed so that data portions are extracted from the markup description languages downloaded from the servers on the network, and if no error is detected as a result of decoding the data portions, the servers on the network are notified that no error is detected, through the browser means, using a method of posting markup description language information. By this construction, data can be correctly downloaded.

According to a twelfth aspect of the present invention, the seventh, eighth, ninth, tenth, or eleventh information terminal is constructed so that a data portion is extracted from a markup description language corresponding to an M-th position of the N (M<N) split markup description languages downloaded from the servers on the network, and if no error is detected as a result of decoding the data portion, a request to send an (M+1)-th data item is issued to the servers on the network, through the browser means, using the method of posting markup description language information. By this construction, data can be correctly downloaded.

According to a thirteenth aspect of the present invention, the seventh, eighth, ninth, tenth, eleventh, or twelfth information terminal is constructed so that a data portion is extracted from a markup description language corresponding to an M-th position of the N (M N) split markup description languages downloaded from the servers on the network, and if an error is detected as a result of decoding the data portion, a request to send the M-th data item is issued to the servers on the network, through the browser means, using the method of posting markup description language information. By this construction, data can be correctly downloaded.

According to a fourteenth aspect of the present invention, the seventh, eighth, ninth, tenth, eleventh, twelfth, or thirteenth information terminal is constructed so that, when the size of data that can be received at a time is S, data to be downloaded is split so that the size of data to be transmitted at a time is S or less. By this construction, even in a network over which only small-sized data can be transmitted at a time is small, large-sized data can be correctly downloaded.

According to a fifteenth aspect of the present invention, a processing program of an information terminal according to one of claims 1 to 14 is recorded in a computer-readable form. By this construction, the program can be distributed in a portable form.

According to a sixteenth aspect of the present invention, an information delivery system comprises: at least a service server, an electronic value server, an information server, and a settlement server which are connected to a network, and an information terminal having a browser, which is connected to the network, can communicate with the servers by use of a markup description language, and can make access to various types of service objects each having a server facility therein, using a markup description language via a local gateway. By this construction, even mobile terminals can use the facilities of both the servers on the network and the service objects through the incorporated browser, no display memory needs to be allocated for each application, no user interface and communication protocol need not be provided for each service, costs can be reduced, and greatly increased convenience can be provided for users.

Embodiments

Embodiments of the present invention will be described in greater details below with reference to FIGS. 2 to 18. It should be noted here that those skilled in the art may appreciate that the present invention may not be limited to the following disclosure, which are for solely the purpose of illustration thereof, and that the present invention may be embodied in other specific forms without departing from the spirit or essential characteristics thereof.

A practical embodiment of the present invention is a mobile multimedia information delivery system which provides: electronic commerce service by which any individual buyer may purchase over the network any tickets, prepaid cards and the like as electronic information, and the examination of tickets and transaction settlement of purchase of merchandises or services may be performed through wireless communication, without presenting a ticket to a clerk at the time of examination of tickets, or without delivering cash and receipts with a salesperson at the time of purchase of a merchandise in a wholesale store; music delivery service by which the buyer purchases music contents as electronic information through the network and downloads it to enjoy the music; and position information service combined with geographic information.

In the following description, this system as have been described above will be referred to as "mobile multimedia information service. The aggregation consisting of any electronic tickets, prepaid cards, and music contents that are dealt with in the present system will be referred to as "electronic value", as well as the entirety consisting of a variety of services provided by the system will be referred to as "mobile multimedia information service", hereinbelow.

The mobile multimedia information delivery system may include, as shown by the system architecture in FIG. 2, a mobile user terminal 101 incorporating bidirectional wireless communication facility of three systems, browsing facility, electronic wallet facility, music player facility, and navigation facility; a music player 116 and a navigation module 117 connected with the mobile user terminal 101 through bluetooth; a user terminal 107 incorporating a bidirectional communication facility, browsing facility, and electronic wallet facility; a service terminal 105 for the transaction settlement processing of electronic value; a service server 106 for serving for the online transaction settlement processing of electronic value; a settlement server 104 for serving for the debit of bank accounts, credit card accounts, or settlement institutions; an information server 102 for providing online information concerning electronic value and for vending electronic value; an electronic value server 103 for generating and issuing electronic value; and gateways 118, 119, and 120, wherein these services are interconnected online over the Internet 100. (The mobile user terminal 101, the service terminal 105, the user terminal 107 are connected with the Internet 100 through the gateways 118, 119, and 120, respectively.) The gateways 118, 119, and 120 through which the mobile user terminal 101, the service terminal 105, the user terminal 107 are respectively connected with the Internet 100, the service server 106, the service server 106, settlement server 104, information server 102, and electronic value server 103 are systems formed by one or a plurality of computers, respectively.

The mobile user terminal 101 is a portable wireless phone terminal having bidirectional wireless communication facility of three systems (IR communication, bluetooth, and digital wireless communication), browsing facility, electronic wallet facility, and music player facility and navigation facility enabled by connecting the music player 116 and the navigation module 117 through bluetooth.

The service terminal 105 has bidirectional wireless communication facility of two systems (IR communication and digital wireless communication) and standalone type and wireless type having respectively different uses.

In FIG. 2, the reference numerals 108 and 113 respectively designate transmission lines for digital wireless communication made while the mobile user terminal 101 and the service terminal 105 are accessing the Internet 100; 109, a transmission line for digital wireless communication between the mobile user terminal 101 and the service terminal 105; 110, 111, 112, 114, and 115, respectively digital communication lines through which the information server 102, electronic value server 103, settlement server 104, service server 106, and user terminal 107 are connected with the Internet 100; and 121 and 122, respectively bluetooth logical transmission lines through which the music player 118 and the navigation module 117 are connected with the mobile user terminal.

The mobile multimedia information service normally assumes the following operation configuration.

The settlement server 104 is installed in banks, credit card companies, or settlement institutions, and the information server 102 is installed in event companies, ticket issuing companies, wholesale stores, prepaid card issuing companies, record companies, and other business companies, which online provide information about electronic values and sell electronic values.

The service terminal 105 may be installed at an entrance of movie theaters, event places, or the like, or register stations in stores if the terminal is of standalone type, and may be carried by a salesperson or money collector if the terminal is portable. The service server 106 may be installed in a firm providing services compatible with the electronic value such as an online shop and Internet broadcasting.

The mobile user terminal 101 may be carried by the consumer, while the user terminal 107 may be installed at the home of the consumer.

The electronic value server 103 may be installed in an organization that provides the mobile multimedia information service.

The connections including the interconnection between devices forming collectively the mobile multimedia information delivery system, and the social relationship among the owners of such system, can be assumed as follows:

The consumer-owner who possesses the mobile user terminal 101 has a contract of accounting with a bank or a credit card company, and another contract of membership of mobile multimedia information service with the service provider of mobile multimedia information service. The owner of the service terminal 105 and the owner of the service server 106 may enter into a contract of franchise system with the mobile multimedia information service provider. It should be noted here that the service terminal 105 owner or service server 106 owner may also be the same mobile multimedia information service provider.

The owner of the information server 102 may enter a contract with the mobile multimedia information service provider in order for the electronic value server 103 to issue electronic value in response to the request from the information server 102. It should be noted here also that the information server 102 owner may be the same service provider of the mobile multimedia information service.

In order to simplify the description on the present system hereinbelow, the consumer-owner of the mobile user terminal 101 will be referred to as "user", the business entity that possesses the service terminal 105 or the service server 106 and sells or provides merchandises and services as "merchant", the company that possesses the electronic value server 103 to provide the mobile multimedia information service as "service provider", the institution that possesses the settlement server 104 to process the transaction settlement of accounts such as banks, credit card companies, or settlement organizations as "transaction processor", and the association that possesses the information server 102 for providing information concerning the electronic value online and selling the electronic value as "electronic value seller". The mobile multimedia information service provided by the system in accordance with the invention is an electronic service, which processes the purchase and sale of tickets, prepaid cards, and music contents via the network, the delivery along therewith, and the exercise of tickets, cards, and music contents.

More specifically, a user may use his/her mobile user terminal 101 to place a purchase order of electronic value to the information server 102 via the Internet, then receive electronic value generated by the electronic value server 103 on the basis of a request of issuing electronic value from the information server 102 to the electronic value server 103 and then store and manage it into the mobile user terminal 101. For using the purchased electronic value such as tickets and prepaid cards, the mobile user terminal 101 may perform data communication with the service terminal 105 or service server 106 to adduce the information of the electronic value stored in the mobile user terminal 101 to exchange the transaction information of electronic value therewith and transact the electronic value, and then the merchant will deliver a service or product. For electronic values such as music contents, the stored electronic values are reproduced. The transaction process along with the purchase and sale of electronic value will be performed between the information sever 10 and the settlement server 14. The details of mobile multimedia information service will be described later.

In mobile multimedia information service, data communication among devices of the present system will be carried out over the transmission line or communication channel as described below. The mobile user terminal 101 may perform digital communication with the information server 102 through the transmission line 108, Internet 100, and digital communication channel 110, may digitally communicate with the electronic value server 103 through the transmission line 108, Internet 100, and digital communication channel 111, may also digitally communicate with the service server 106 through the transmission line 108, Internet 100, and digital communication channel 111, may perform IR communication with the service terminal 105 through a transmission line 109, and may perform bluetooth communication with the music player 116 through the transmission line 121 and with the navigation module 117 through the transmission line 122, respectively.

In the communication between the mobile user terminal 101 and electronic value server 103, communication between the mobile user terminal 101 and service terminal 105, and communication between the mobile user terminal 101 and service server 106, any transaction information will be encrypted. For the encryption, a combination of the common secret key encryption and the public key encryption are used to encapsulate information into an envelope before communication. Components of the present system will then be described below in greater details.

At first the service terminal 105 will be detailed.

Figure 10:
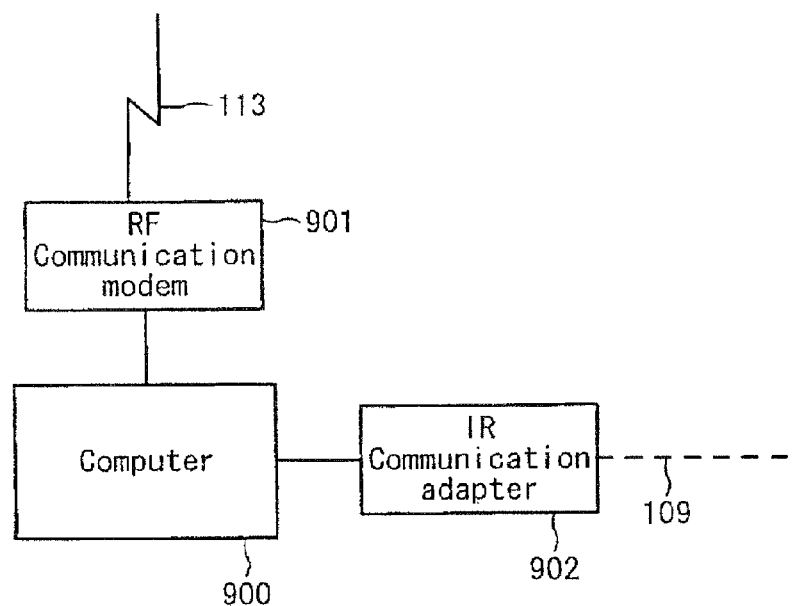
FIG. 10 is a schematic block diagram of a service terminal in accordance with an embodiment of the present invention.

Now referring to FIG. 10, there is shown a schematic block diagram of a service terminal 105. In FIG. 10, the service terminal 105 consists of a computer 900, a wireless modem 901, and an IR communication adapter 902. The service terminal 105 has two communication facilities, for digital wireless communication and IR communication. The digital wireless communication is used for accessing to the Internet, while the IR communication facility is used for the electronic value transaction with the mobile user terminal. The computer 900 may incorporate a merchant application program, with which the computer 900 controls the wireless modem 901 and the IR communication adapter 902 to perform the transaction, based on this merchant application. In a similar manner, the service server 106 may also incorporate a merchant application, with which the service server 106 performs the electronic value transaction, based on this merchant application.

Next, the user terminal 107 will be detailed.

Figure 11:
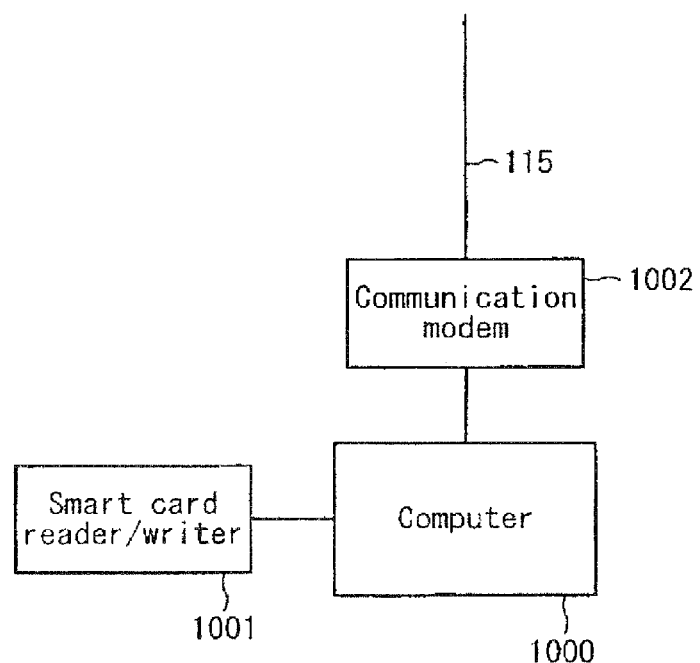
FIG. 11 is a schematic block diagram of a user terminal in accordance with an embodiment of the present invention.

Now referring to FIG. 11, there is shown a schematic block diagram of a user terminal 107. In FIG. 11, the user terminal 107 consists of a computer 1000, a smart card reader/writer 1001, and a modem 1002. The user terminal 107 may incorporate a browser application program and an electronic wallet application program, and access the Internet via the modem 1002. By inserting a smart card of the mobile user terminal 101 into the smart card reader/writer 1001, the user terminal 107 may have the same functionality as the mobile user terminal 101 except for the transaction processing to and from a service terminal 105.

Next, the mobile user terminal 101 will be detailed.

Figure 3:
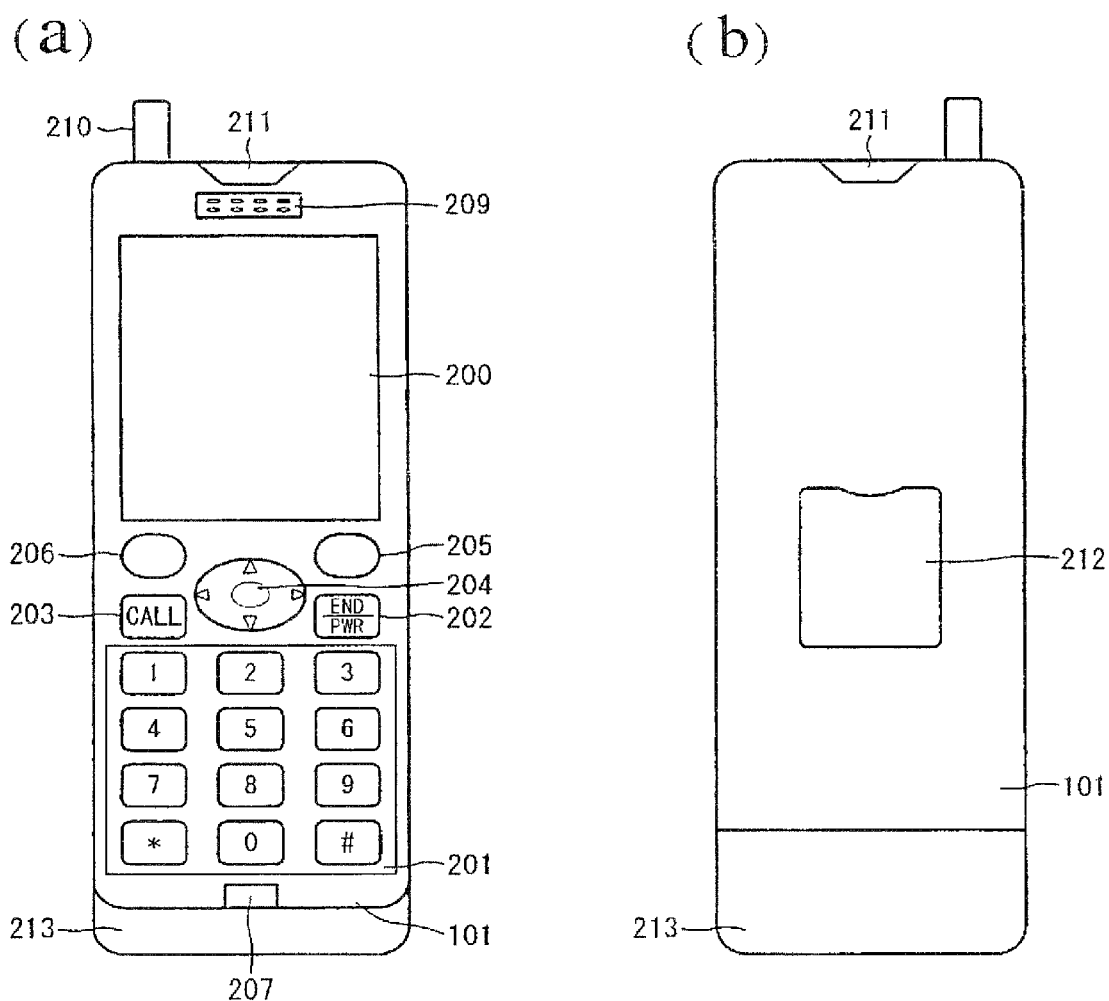
FIG. 3(a) is a schematic front view of a mobile user terminal in accordance with an embodiment of the present invention.
FIG. 3(b) is a schematic rear view of a mobile user terminal in accordance with an embodiment of the present invention.

Now referring to FIG. 3(*a*) and FIG. 3(*b*), there are shown front and rear views of a mobile user terminal 101. In FIG. 3(*a*), the reference numeral 211 designates to an IR port (IR module) for IR communication with the service terminal 105; the reference numeral 213 to a bluetooth communication module for communication with the music player 116 and the navigation module 117 in bluetooth environment; the reference numeral 210 to an antenna for transmitting and receiving RF waves of digital wireless communication; the reference numeral 209 to a receiver/loudspeaker; the reference numeral 200 to a color liquid crystal display (LCD) device capable of displaying 120 by 160 pixels; the reference numeral 203 to an off-hook switch; the reference numeral 202 to an on-hook & power-on/off switch for both hanging on a call and powering on/off the device; the reference numeral 204 to a navigation switch; the reference numerals 205 and 206 to function switches; and the reference numeral 201 to a ten-key pad; the reference numeral 207 to a microphone. In FIG. 3(*b*), the reference numeral 212 designates to a smart card slot (smart card reader/writer).

The mobile user terminal 101 has three communication facilities for the digital wireless communication, for the IR communication, and for bluetooth. The digital wireless facility is used for voice calls and Internet accessing, as well as the transaction processing of electronic value with a service server. The IR communication facility is used for the transaction processing of electronic value with a service terminal. The bluetooth communication facility is used to connect the music player 116 and the navigation module 117 to provide the music player facility and the navigation facility. The mobile user terminal 101 further has a browser facility and electronic wallet facility. The browser facility is used for browsing the Internet and the locally stored data in the mobile user terminal, and the electronic wallet facility is used for managing the electronic value and transaction.

Figure 4:
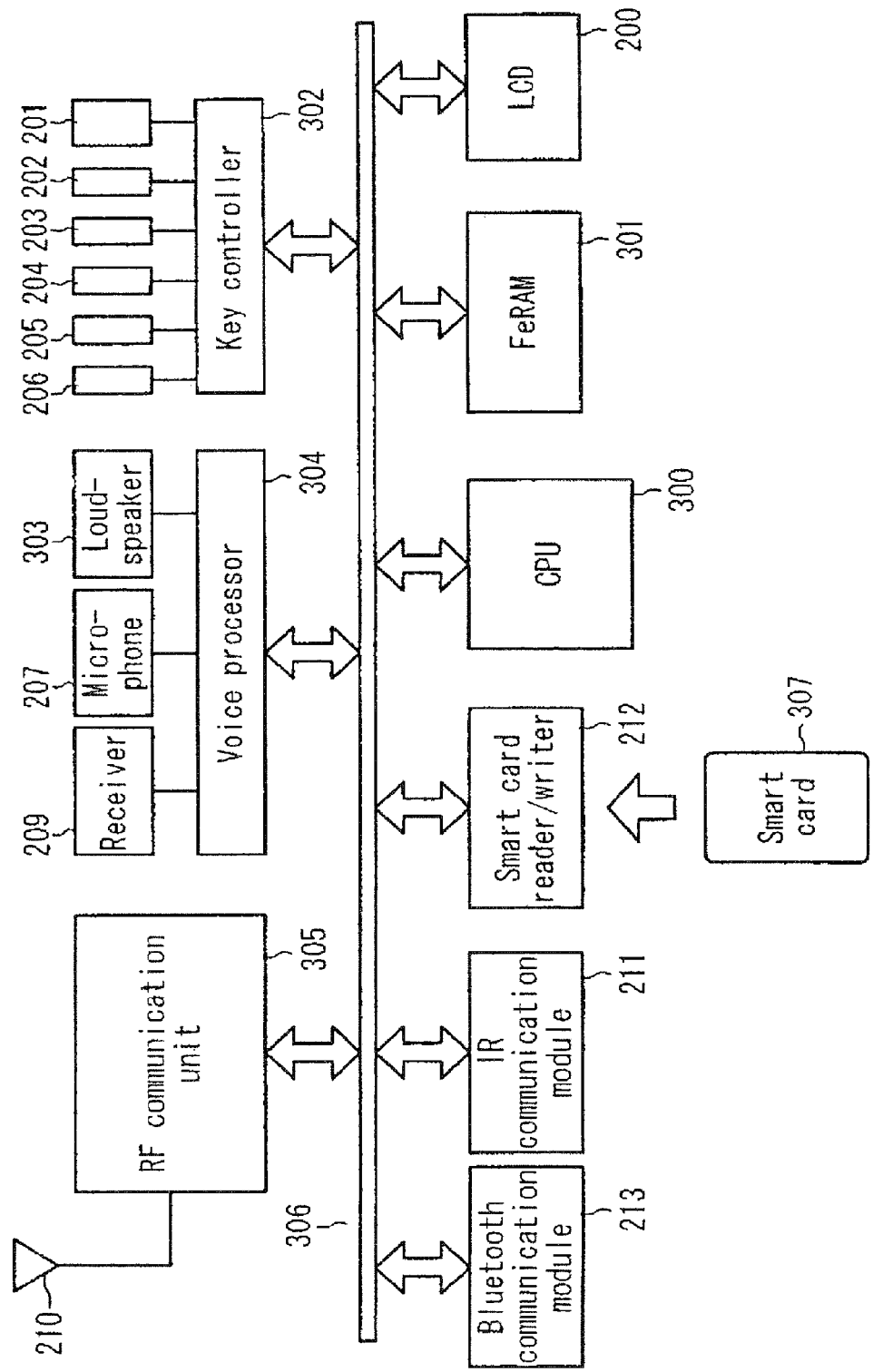
FIG. 4 is a schematic block diagram of a mobile user terminal in accordance with an embodiment of the present invention.

Now referring to FIG. 4, there is shown a schematic block diagram of a mobile user terminal 101. In FIG. 4, the mobile user terminal 101 comprises a CPU (central processing unit) 300 that operates based on a program stored in an FeRAM (Ferroelectric Random Access Memory) 301 to process data stored in the FeRAM 301, transmit and receive data, and control other components via a bus 306; an LCD 200; an IR communication module 211; a bluetooth communication module 213; a smart card reader/writer 212; a ten-key pad 201; hung-on/power-on/off switch 202; a call switch 203; a navigation switch 204; function switches 205 and 206; a key controller 302 for detecting switch operation; voice processor 304 for driving a loudspeaker 303 and a receiver 209 and digitally processing analog voice signals input from a microphone 207; RF communication unit 305 for controlling wireless data communication via an antenna 210 and wireless voice calls; and a smart card 307.

The smart card 307 may have therein a CPU and a non-volatile memory, which stores a universal personal telecommunication number (UPT; telephone number) of its user, a user ID in the mobile multimedia information service, a user private key of the public key cryptography method, a user certificate corresponding to the private key, as well as a certificate of the service provider (digital certificate of the service provider), electronic value that the user has already purchased, and receipts of the purchase of electronic value and for the transaction processing thereof.

In the FeRAM 301, in addition to the operating system (OS), a phone program, and a browser, three application programs including an electronic wallet, a music player object, and a navigator object, an application program of a local gateway serving as an interface for accessing the three applications from the browser, and data processed by the applications are stored. The electronic wallet object is an application running on the mobile user terminal that provides the electronic wallet facility, in conjunction with the smart card 307; the music player object is an application running on the mobile user terminal that provides the music player facility, in conjunction with the music player 116; and the navigator object is an application running on the mobile user terminal that provides the navigation facility, in conjunction with the navigation module 117.

Figure 9:
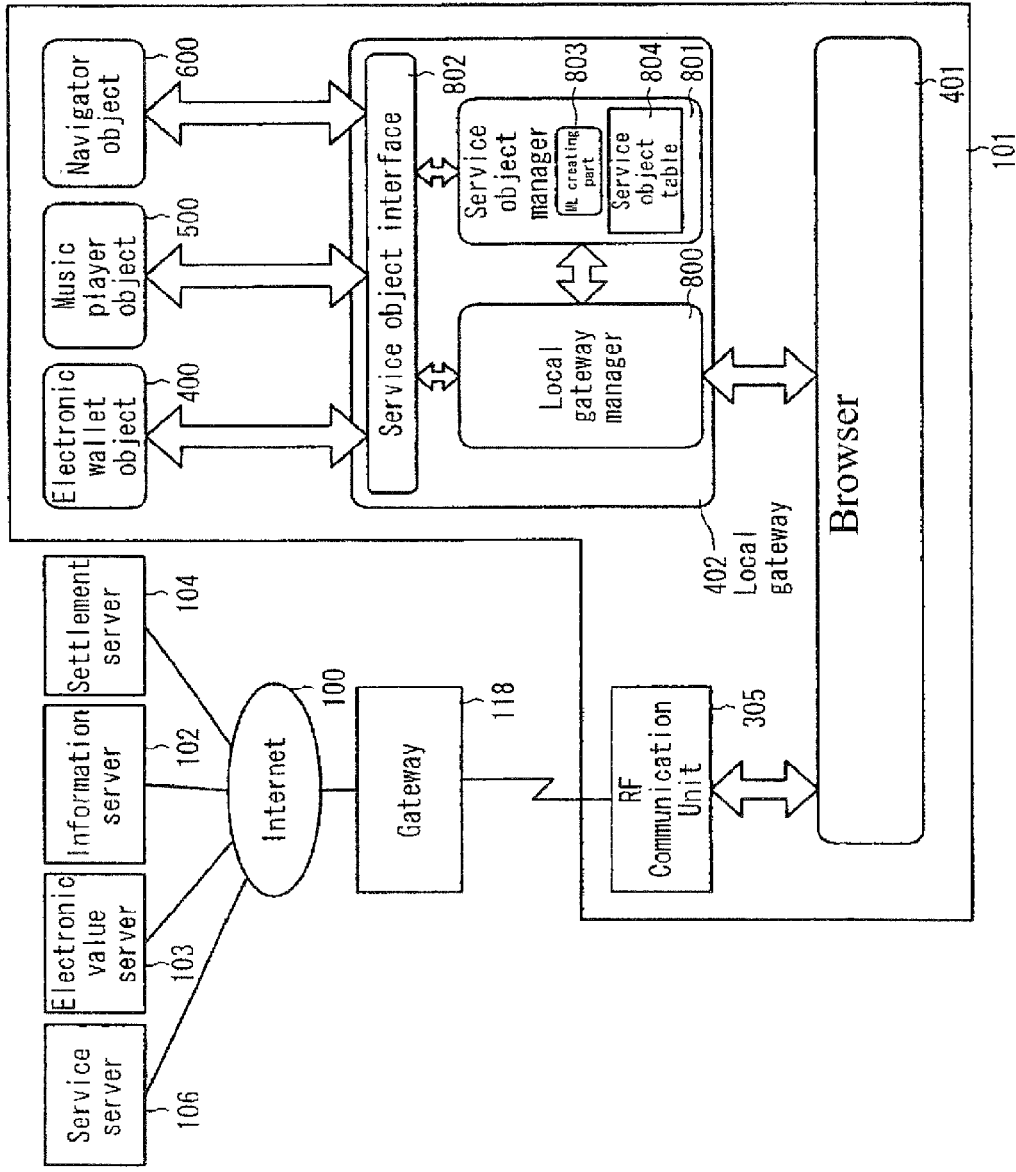
FIG. 9 is a schematic diagram illustrating the relationship between applications executed by the CPU 300 in accordance with an embodiment of the present invention and a browser.

FIG. 9 is a schematic diagram illustrating the relationship between the applications executed by the CPU 300 and the browser. The local gateway 402 provides facilities corresponding to the wireless communication part 305 and the gateway 118 used by the browser to access the Internet, and servers as an application-level interface for accessing the electronic wallet object 400, the music player object 500, and the navigator object 600 from the browser. The electronic wallet object 400, the music player object 500, and the navigator object 600 respectively provide facilities corresponding to servers during access to the Internet, and for access from the browser, return results described in a markup description language to the browser via the local gateway 402.

The local gateway 402 comprises: a local gateway manager 800 that controls the local gateway 402; a service object manager 801 that manages the statuses of service objects including the electronic wallet object 400, the music player object 500, and the navigator object 600; and a service object interface 802 serving as a common interface with the service objects. The service object manager 801 creates a service object table 804 for managing the statuses of the service objects on the FeRAM 301 to manage the statuses of the service objects. An ML creating part 803 creates a markup description indicating a list of usable services from the service object table 804.

The service object table 804, for one service object, contains a service name, unique name, and serial number, URI of the service object, status information indicating whether it can be used, and handle information for actually accessing the service object in the mobile user terminal.

Figure 5:
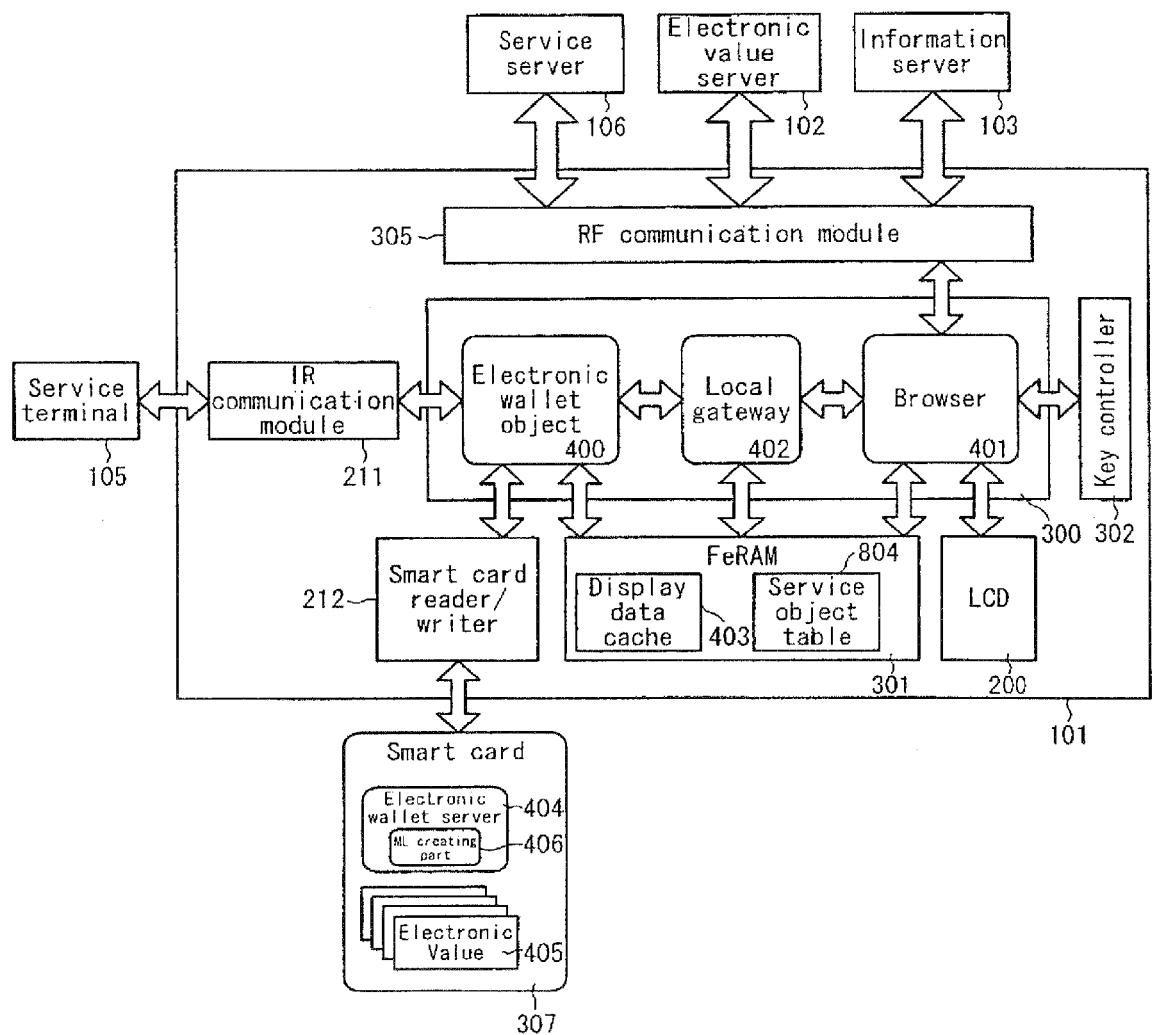
FIG. 5 is a schematic diagram showing the relationship among applications (browser, electronic wallet object, and local gateway) and other components of a mobile user terminal in accordance with an embodiment of the present invention, and other devices.

FIG. 5 is a schematic diagram showing the relationship among applications (browser, electronic wallet object, and local gateway) executed by the CPU 300 when the electronic wallet facility is used, other components of the mobile user terminal 101, and other devices. In FIG. 5, the CPU 300 executes three processes, the browser 401, the electronic wallet object 400, and the local gateway 402.

Electronic value is stored in a nonvolatile memory of the smart card 307, and the CPU of the smart card 307 creates a markup description language on the contents of electronic wallet (ML creating part 406), and executes the application program of an electronic wallet server 404 that split-downloads the electronic value, and performs examination and settlement processing.

The browser 401 may accept the user operation information (switch operation) sent from the key controller 302 to use the RF communication unit 305 to communicate with the electronic value server 103 via the Internet 100. The browser 401 may also interpret data receive from the electronic value server 103 to display on the LCD 200. The data received from the electronic value server 103 in this situation is written in a specific markup language, and the browser 401 interprets the markup language to restore image data to display on the LCD 200. In a similar manner, the browser 401 interprets data received from the local gateway 402 and data received from the electronic wallet object 400 via the local gateway 402 to display on the LCD 200. Here the data received from the local gateway 402 and data received from the electronic wallet 400 are written in a specific markup language.

As an example, referring to FIG. 8(*a*), there is shown a "My Menu" display screen, which is presented on the LCD 200 at the power-on. When powering on by means of the hung-on/power-on/off switch 202, the browser 401 asks the local gateway 402 for a list of usable services and displays a screen shown in FIG. 8(*a*). The local gateway manager 800 asks for a list of usable services the service object manager 801, which creates a list of usable services written in markup languages from the service object table 804 by use of the ML creating part 803, and the created list of usable services is returned to the browser 401 via the local gateway manager 800. The "My Menu" file is an operation menu of the mobile user terminal 101, written in a specific markup language.

Now assuming that the user selects from the menu item "1:Internet", to which an absolute URI (Universal Resource Identifier) of "http://www.mmiserv.com/mu ierm/menu" is linked, the browser 401 will access the Internet using the character string "http" as key and display an Internet Menu screen linked to the menu item "1:Internet", as shown in FIG. 8(*b*). Then the user may access to an Internet site, for example the information server 102, from this menu. FIG. 8(*c*) depicts an exemplary display screen when access to an information server 102 to place an order of electronic value.

Assuming that the user selects "2:E-Wallet" from the "My Menu", the browser 401 may access to the electronic wallet object 400 via the local gateway 402, and display another screen for requesting a password input, based on the data received from the electronic wallet 400, as shown in FIG. 8(*d*). When the user inputs his/her password in this screen, the browser 410 in turn will send the password input to the electronic wallet 400 via the local gateway 402. If the password is correct, the electronic wallet 400 will send data including a list of electronic value stored in and managed by the electronic wallet 400 to the browser 401 via the local gateway 402. Then the browser 401 will display the screen as shown in FIG. 8(*e*). If the password is not correct, then an error will be displayed. Assuming that the user selects "7:Soccer 200X Japa" menu item, data indicating the contents of electronic value selected will be sent from the electronic wallet to the browser 401 via the local gateway 402, and the browser 401 will display a screen as shown in FIG. 8(*f*).

In the above situation, the data sent from the electronic wallet 400 to the browser 401 is created by the electronic wallet server 404 on the smart card 307 and is written in a specific markup language. For example, "2 E-Wallet" shown in FIG. 8(*a*) is linked to "lgw://wallet", which is a relative URI to the local gateway 402, and the browser 401 interprets the user's selection operation as a resource being using a character string of "lgw" as key via the local gateway 402, and in the next step, using the character string of "wallet", accesses a service object having the service name of "wallet", that is, the electronic wallet object 400 via the local gateway 402. In response to this selection operation, to authenticate the user, data written in a specific markup description language as shown in FIG. 15 is sent to the browser 401 from the electronic wallet object 400 to display a screen for prompting the user to enter a password.

"ok" operation on the screen shown in FIG. 8 is linked to the processing that an entered password is sent to "lgw://wallet/", which is a relative URI to the local gateway 402. When the user enters a password, the browser 401 will send the entered password to the electronic wallet object 400 via the local gateway 402. In response to this operation, if the password is correct, a list of electronic values written in a specific markup description language will be sent to the browser 401 via the local gateway 402 to display the screen shown in FIG. 8(*e*). If the password is incorrect, data indicating an error, written in a specific markup language, is sent to the browser 401 from the electronic wallet object 400 via the local gateway 402 to display an error screen.

Figure 6:
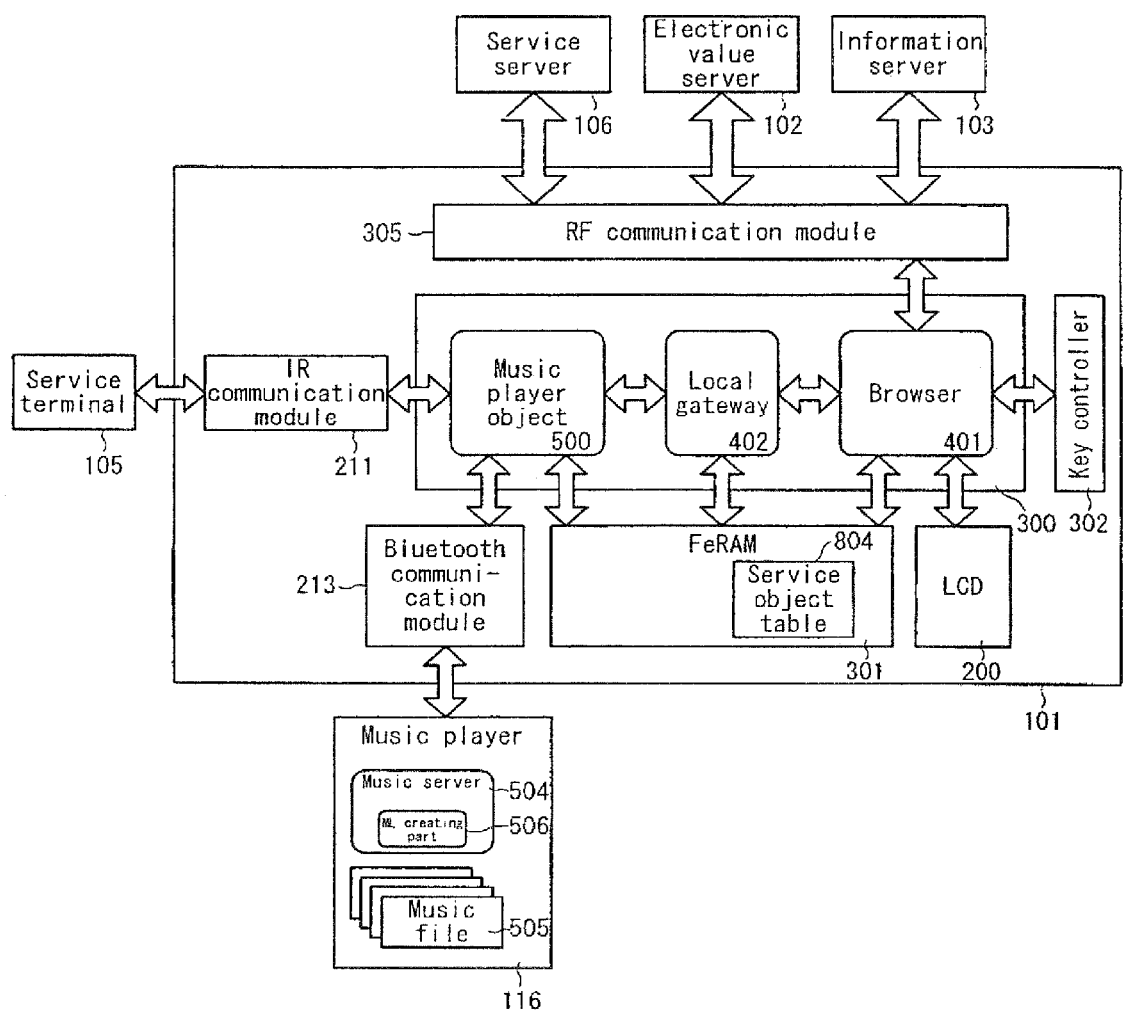
FIG. 6 is a schematic diagram showing the relationship among applications (browser, music player object, and local gateway) and other components of a mobile user terminal in accordance with an embodiment of the present invention, and other devices.

FIG. 6 is a schematic diagram showing the relationship among applications (browser, music player object, and local gateway) executed by the CPU 300 when the music player facility is used, other components of the mobile user terminal 101, and other devices. In FIG. 6, the CPU 300 executes three processes, the browser 401, the music player object 500, and the local gateway 402.

A music file 505 is stored in a nonvolatile memory module mounted in the music player 116, and the CPU of the music player 116 creates a markup description language (ML creating part 506) on the contents of the music player, and executes the application program of a music server 504 that split-downloads and reproduces the music file 505.

For example, assuming that the user selects "4 Music Player", the browser 401 will access the music player object 500 via the local gateway 402, data indicating a list of music files managed in the music player object 500 will be sent to the browser 401 from the music player object 500 via the local gateway 402, and the browser 401 will display the screen shown in FIG. 8(*g*). Further, if the user selects "–1 song for you" for play, the selected music title will be played. In the above situation, data sent from the music player object 500 to the browser 401 is created by the music server 504 on the music player 116 and is written in a specific markup description language. For example, "4 Music Player" shown in FIG. 8(*a*) is linked to "lgw://music_player/", which is a relative URI to the local gateway 402, and the browser 401 interprets the user's selection operation as a resource being accessed using the character string of "lgw" as key via the local gateway 402, and in the next step, using the character string of "music_player", accesses a service object having the service name of "music_player", that is, the music player object 500 via the local gateway 402. In response to this selection operation, a list of music files written in a specific markup description language are sent to the browser 401 from the music player object to display the screen shown in FIG. 8(*g*). Further, "–1 song for you" shown in FIG. 8(*g*) is linked to "lgw://music_player/play?track=1", which is a relative URI to the local gateway 402, and the browser 401 interprets the user's selection operation as a resource being accessed using the character string of "lgw" as key via the local gateway 402, and in the next step, using the character string of "music_player", accesses a service object having the service name of "music_player", that is, the music player object 500 via the local gateway 402 to request playing a music title.

Figure 7:
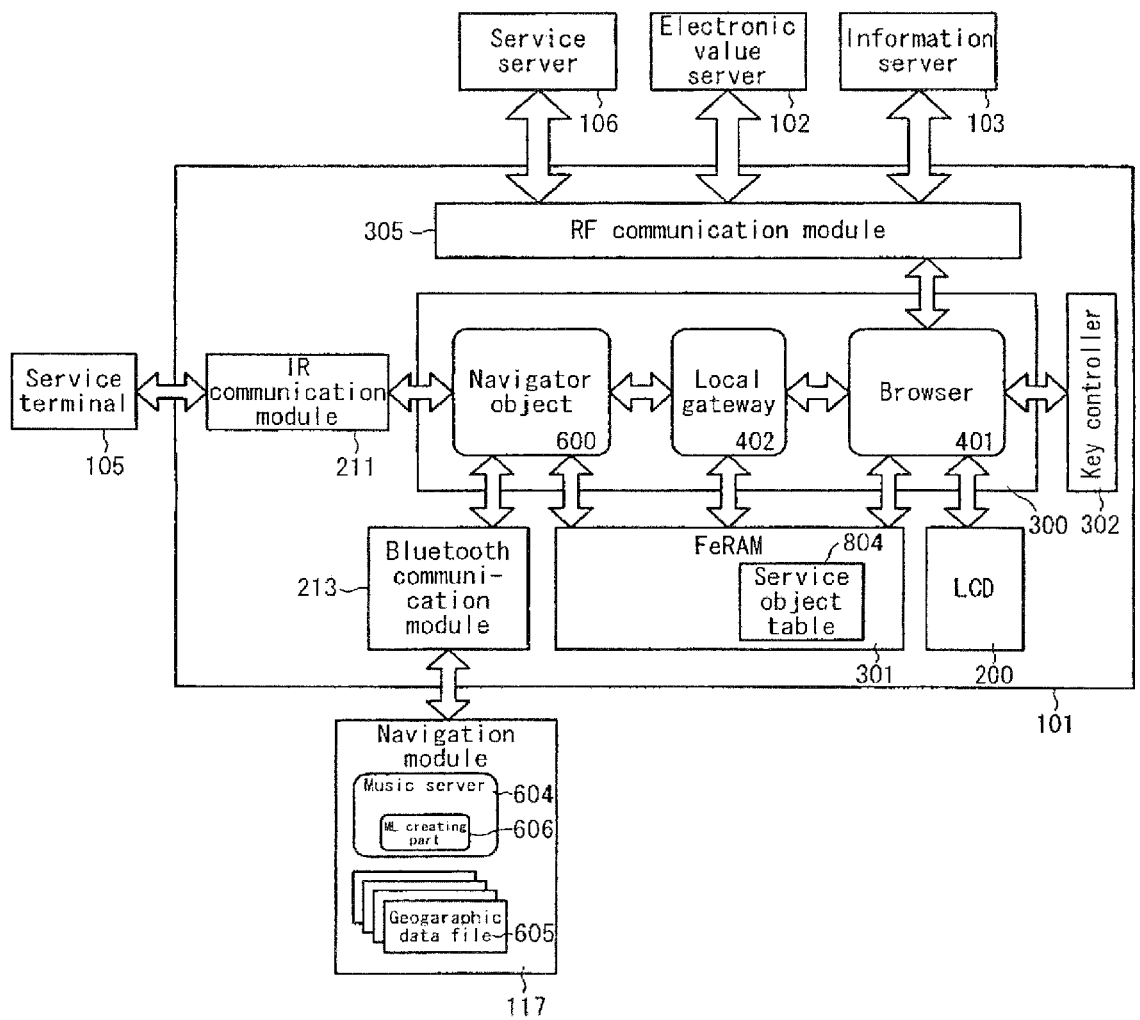
FIG. 7 is a schematic diagram showing the relationship among applications (browser, navigator object, and local gateway) and other components of a mobile user terminal in accordance with an embodiment of the present invention, and other devices.

FIG. 7 is a schematic diagram showing the relationship among applications (browser, navigator object, and local gateway) executed by the CPU 300 when the navigator facility is used, other components of the mobile user terminal 101, and other devices. In FIG. 7, the CPU 300 executes three processes, the browser 401, the navigator object 600, and the local gateway 402.

A geographic data file 605 is stored in a nonvolatile memory module mounted in the navigation module 117, and the CPU of the navigation module 117 creates a markup description language (ML creating part 606) on the contents of the navigation module, and executes the application program of a navigation server 604 that split-downloads and reproduces the geographic data file 605.

For example, assuming that the user selects "5 Navigator", the browser 401 will access the navigator object 600 via the local gateway 402, data indicating a current position and a peripheral map will be sent to the browser 401 from the navigator object 600 via the local gateway 402, and the browser 401 will display the screen shown in FIG. 8(*h*).

In the above situation, data sent from the navigator object 600 to the browser 401 is created by the navigation server 604 on the navigation module 117 and is written in a specific markup description language. For example, "5 Navigator" shown in FIG. 8(*a*) is linked to "lgw://navigator", which is a relative URI to the local gateway 402, and the browser 401 interprets the user's selection operation as a resource being accessed using the character string of "lgw" as key via the local gateway 402, and in the next step, using the character string of "navigator", accesses a service object having the service name of "navigator", that is, the navigator object 600 via the local gateway 402.

Next, a description will be made of the split-download facility of the service objects including the electronic wallet server 404, the music server 504, and the navigation server 604. The split-download facility, when the size of data transferable at a time is small, splits large-capacity electronic value containing image data, and large-capacity music file and geographic data into a small unit of data before downloading them. As a specific example of this facility, a description will be made of a case where the electronic value is halved and downloaded to the electronic wallet from the electronic value server.

Figure 12:
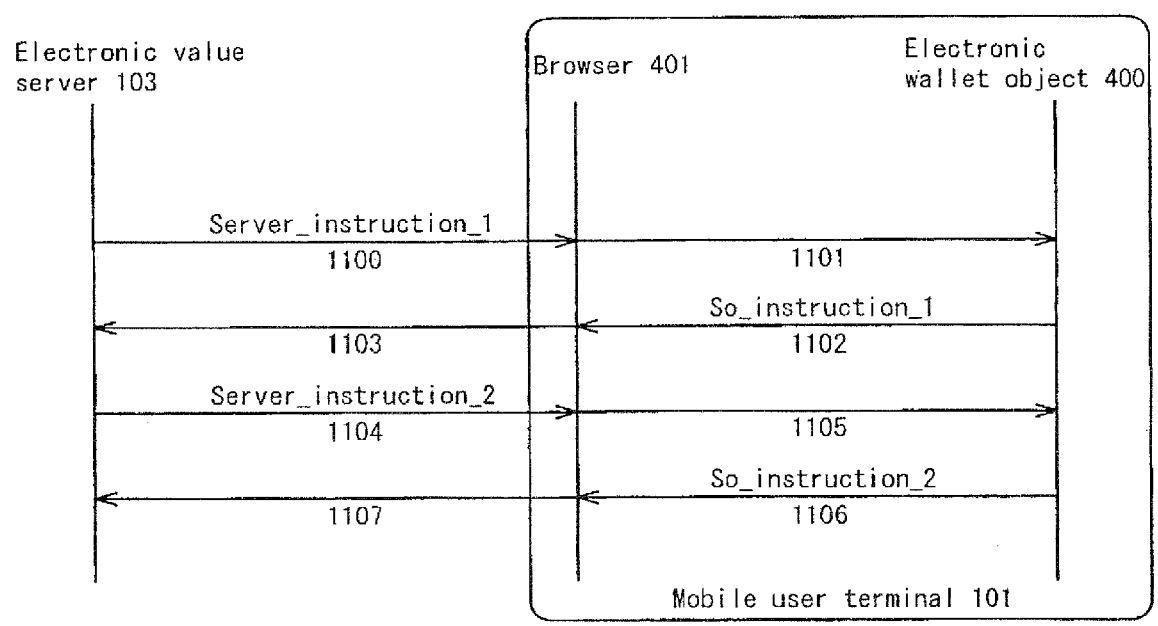
FIG. 12 is a flow chart showing the processing of splitting and downloading electronic value in accordance with an embodiment of the present invention.

FIG. 12 shows messages exchanged among the electronic value server 103, the browser 401, and the electronic wallet object 400 in the case where the electronic value is halved and downloaded.

From the electronic value server 103 to the browser 401, a message Server_instruction_1 1100 is sent to request the downloading of the first of two split data items of the electronic value. The contents of Server_instruction_1, as shown in FIG. 13(*a*), contain an instruction to the electronic wallet object 400 as the attributes of an Go element. According to FIG. 13(*a*), the instruction specifies downloading (fragmentDL) data "1234567890 . . . abcdefghij" (DLdata) in the condition that session ID (session_id) is 1234, a split count (num_frag) is 2, the first (frag_num) of two split data items is sent, and URI (DLserver) of the electronic value server 103 is "http://www.evissuer.com". At this time, the data (DLdata) to be downloaded is encrypted and encoded for error detection, and further encoded to ASCII data.

The browser 401 sends the attribute portion 1101 of the Go element of Server_instruction_1 to a service object having the service name of "wallet", that is, the electronic wallet object via the local gateway 402.

The electronic wallet object 400 interprets the instruction contained in the attribute portion 1101 of the received Go element, checks the downloaded data (DLdata) for errors, decrypts the data, and if no error is found, sends a message S0_instruction_1 1102 to request the sending of a second data item to the browser 401. The contents of Server_instruction_1 1102, as shown in FIG. 13(*b*), contain an instruction to the electronic value server 103 as the attributes of an Go element. According to FIG. 13(*b*), the instruction requests the sending (send_frag) of the second item (frag_num) of the split data with a session ID (session_id) of 1234. If an error is detected in the downloaded data, the number of the split data item in which the error is detected is specified as frag_num.

The browser 401 sends the attribute portion 1103 of the Go element of S0_instruction_1 1102 to "http://www.evissuer.com", that is, the electronic value server 103.

The electronic value server 103 interprets an instruction contained in the attribute portion of the received Go element, and sends a message Server_instruction_2 1104 to request the downloading of the second of the two split data items of the electronic value to the browser 401.

The contents of Server_instruction_2, as shown in FIG. 14(*a*), contain an instruction to the electronic wallet object 400 as the attributes of an Go element. According to FIG. 14(*a*), the instruction specifies downloading (fragmentDL) data "1234567890 . . . abcdefghij" (DLdata) in the condition that session ID (session_id) is 1234, a split count (num_frag) is 2, the second (frag_num) of two split data items is sent, and URI (DLserver) of the electronic value server 103 is "http://www.evissuer.com". At this time, the data (DLdata) to be downloaded is encrypted and encoded for error detection, and further encoded to ASCII data.

The browser 401 sends the attribute portion 1105 of the Go element of Server_instruction_2 1104 to a service object having the service name of "wallet", that is, the electronic wallet object via the local gateway 402.

The electronic wallet object 400 interprets the instruction contained in the attribute portion 1105 of the received Go element, checks the downloaded data (DLdata) for errors, decrypts the data, and if no error is found, creates one electronic value from the two split data and stores it in a smart card, and sends a message S0_instruction_2 1106 indicating the completion of the downloading to the browser 401.

The contents of S0_instruction_2 1106, as shown in FIG. 14(*b*), contain an instruction to the electronic value server 103 as the attributes of an Go element. According to FIG. 14(*b*), the contents of the instruction indicate that data of the session ID (session_id) of 1234 has been downloaded (DLcomplete).

The browser 401 sends the attribute portion 1107 of the Go element of S0_instruction_2 1106 to "http://www.evissuer.com", that is, the electronic value server 103.

The electronic value server 103 interprets an instruction contained in the attribute portion 1107 of the received Go element, and completes the electronic value issuance processing.

As has been described above, by providing a local gateway for applications, and server facilities for the applications (service objects), a mobile terminal having a small display screen permits the screen to be shared among plural applications so that no display memory needs to be provided for each of the applications, and can offer multi-application services, regardless of the small memory.

Further, by adding the data split-download facility to the server facilities of the applications (service objects), even if the size of data that can be transferred at a time is small, large-capacity data can be downloaded without making changes to the RF communication unit 305.

Figure 16:
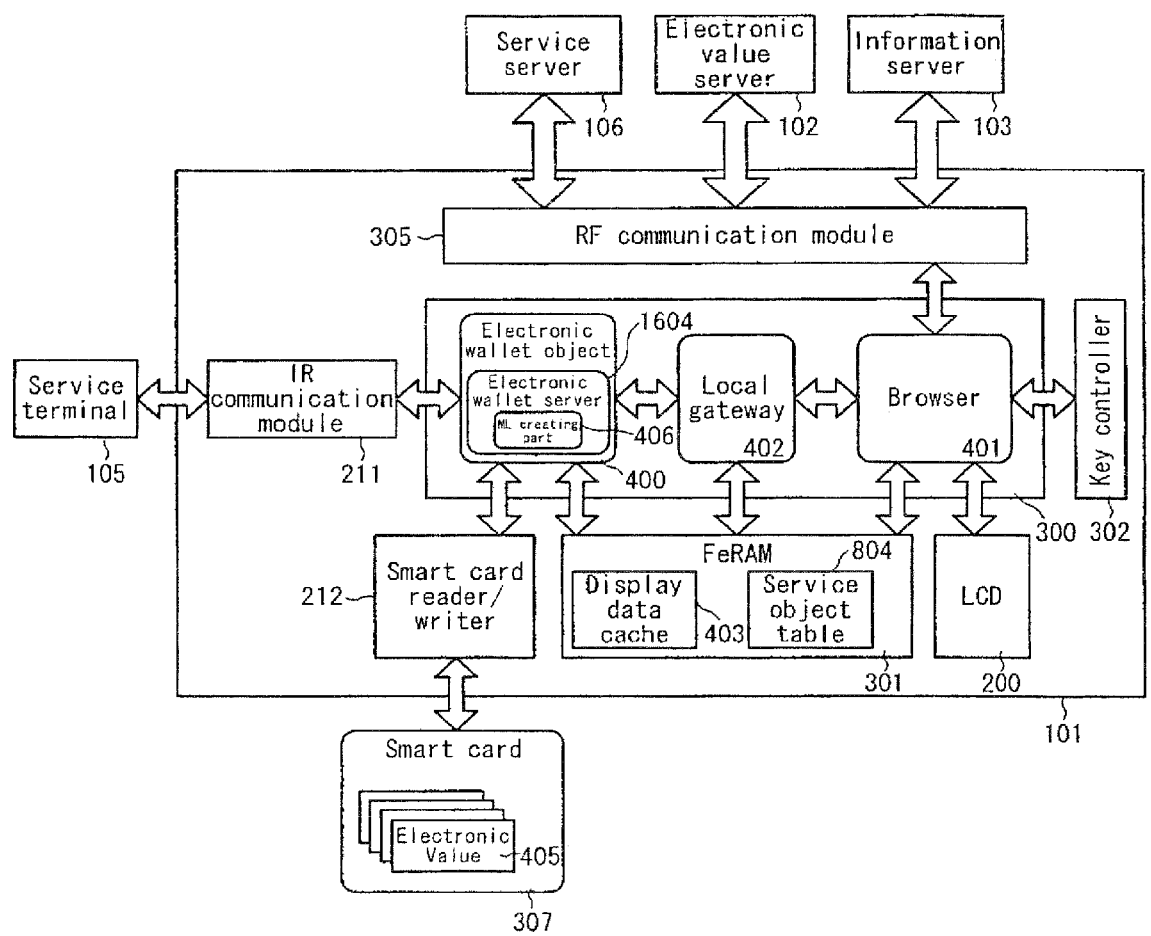
FIG. 16 is a schematic diagram showing the relationship among applications (browser, electronic wallet object, and local gateway) and other components of a mobile user terminal in accordance with an embodiment of the present invention, and other devices.

Although, in the above described configuration, the electronic wallet server 404 is used as an application of the smart card 307, it may be one module of the electronic wallet server 404, as shown in FIG. 16. In this case, the electronic wallet server 1604 accesses the smart card 307 via the smart card reader/writer 212 to perform the creation of a markup description language on the contents of electronic wallet (ML creating part 406), electronic value split-download, and examination and settlement processing, in conjunction with the smart card 307. A decreased amount of processing in the smart card 307 contributes to reduction in a memory size thereof, providing the advantage of the smart card being inexpensively produced.

Figure 17:
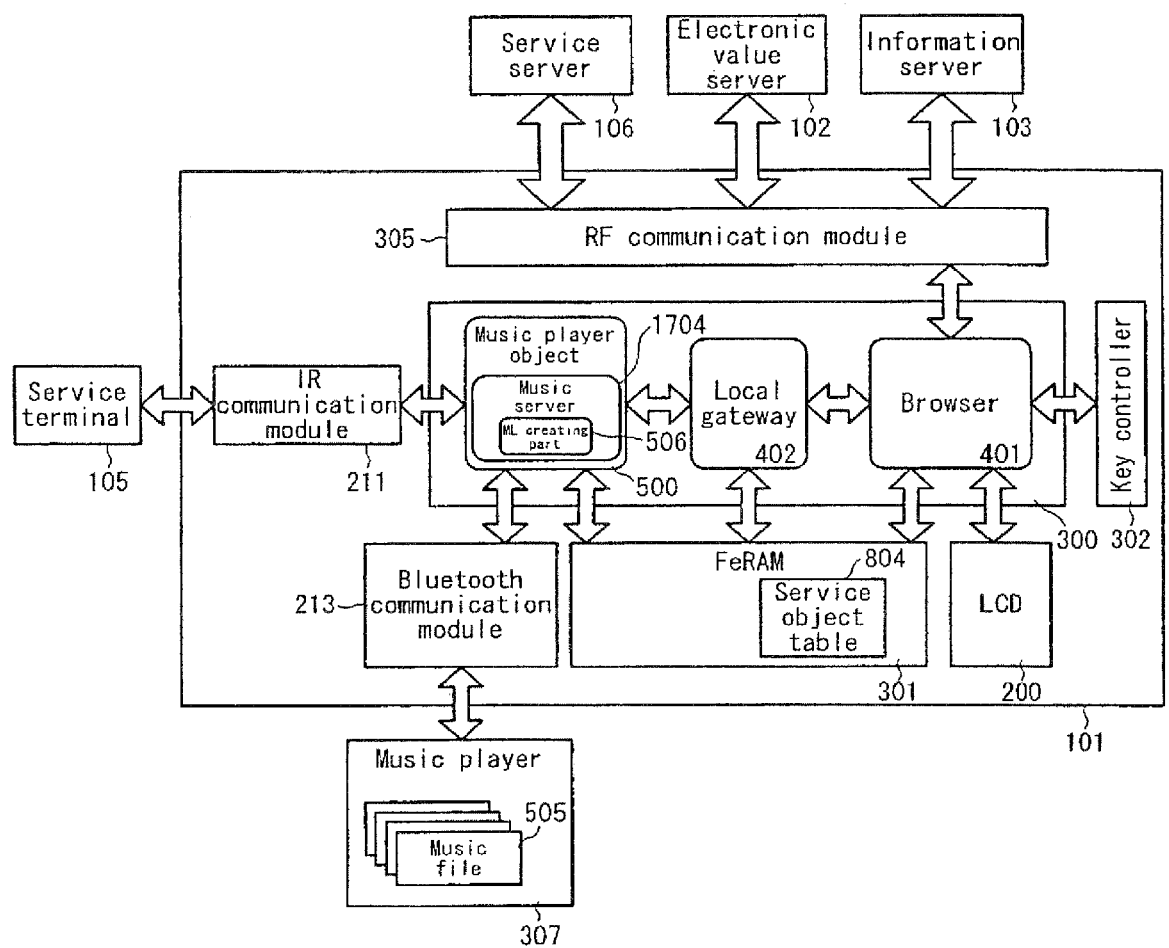
FIG. 17 is a schematic diagram showing the relationship among applications (browser, music player object, and local gateway) and other components of a mobile user terminal in accordance with an embodiment of the present invention, and other devices.

Although, in the above described configuration, the music server 504 is used as an application of the music player 116, it may be one module of the music player object 500, as shown in FIG. 17. In this case, the music server 1704 accesses the music player 116 via the Bluetooth communication module 213 to perform the creation of a markup description language on the contents of music player (ML creating part 506), and the split-download and reproduction of the music file 505, in conjunction with the music player 116. A decreased amount of processing in the music player 116 contributes to reduction in a memory size thereof, providing the advantage of the smart card being inexpensively produced.

Figure 18:
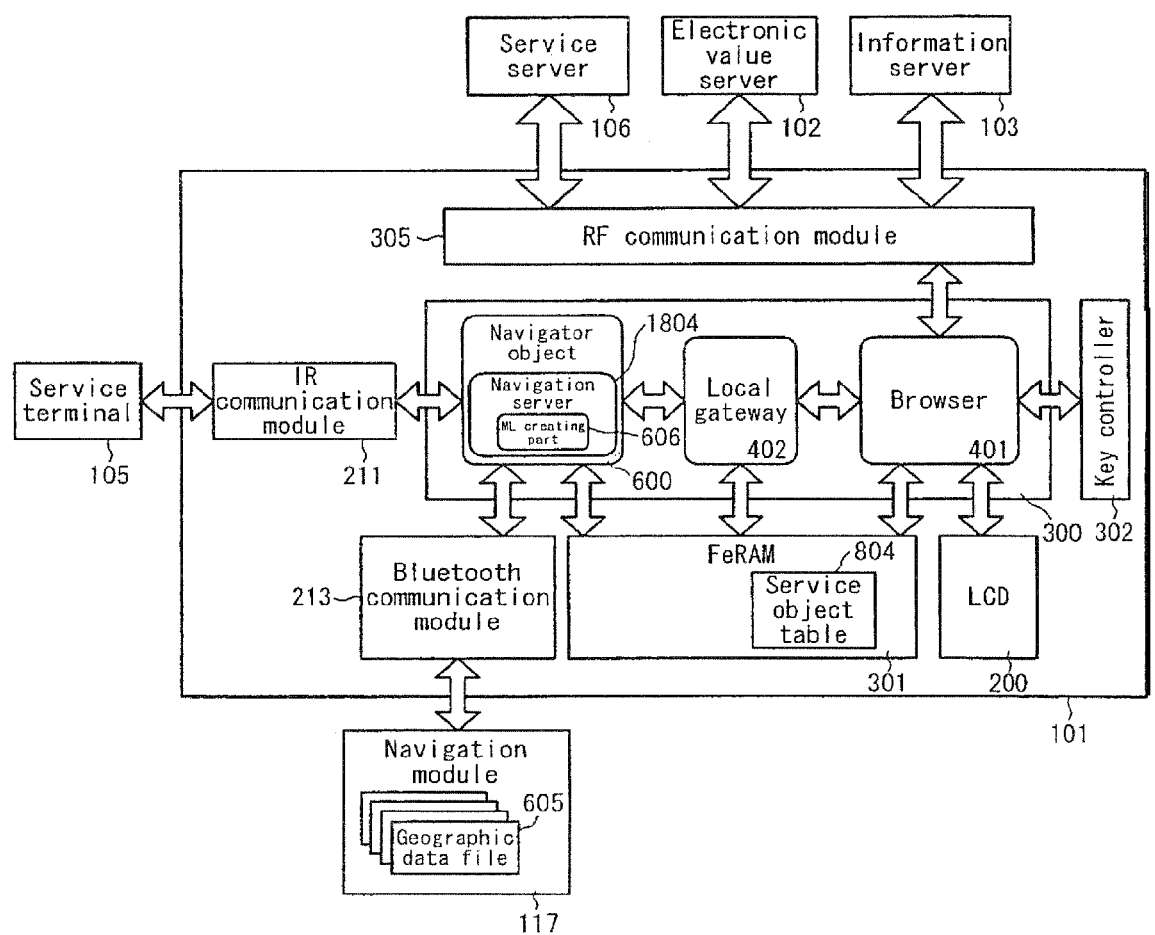
FIG. 18 is a schematic diagram showing the relationship among applications (browser, navigator object, and local gateway) and other components of a mobile user terminal in accordance with an embodiment of the present invention, and other devices.

Although, in the above described configuration, the navigation server 604 is used as an application of the navigation module 117, it may be one module of the navigator object 600, as shown in FIG. 18. In this case, the navigation server 1804 accesses the navigation module 117 via the Bluetooth communication module 212 to perform the creation of a markup description language on the contents of the navigation module (ML creating part 606), and the split-download and reproduction of the geographic data file 605, in conjunction with the navigation module 117. A decreased amount of processing in the navigation module 117 contributes to reduction in a memory size thereof, providing the advantage of the smart card being inexpensively produced.

Although, in the above described configuration, an ML creating part for creating a markup description language is provided separately for each service object and the service object manager 801, it may be configured as one module shared by applications on the mobile terminal 101. In this case, a decreased amount of the application programs on the mobile user terminal 101 contributes to reduction in a memory size thereof, providing the advantage of the mobile user terminal being inexpensively produced.

Although, in the above described configuration, the IR communication is used for communication between the mobile user terminal 101 and the service terminal 105, another wireless communication system may be used. In this case, the mobile user terminal 101 is provided with a wireless communication means of the wireless communication system instead of the IR communication module 111, and the service terminal 105 is provided with a wireless communication means of the wireless communication system instead of the IR communication adapter 602.

Although, in the above description, the mobile user terminal 101 constituting the mobile multimedia information delivery system has an optimum hardware configuration for achieving the facilities in the mobile multimedia information service, the mobile user terminal 101 may also be constituted by a computer having facilities including the digital wireless communication facility, the infrared communication facility, and the bluetooth communication facility, a smart card reader/writer, a display, a keyboard (or pen input device), a microphone, and a loudspeaker. In this case, a program stored in the FeRAM 301 is converted to a software program operating on the OS (Operating System) of the personal computer, and the software program is stored in a place (e.g., hard disk) where it can be executed in the computer. ,

What is claimed is:

1. An information processing method at a mobile terminal, the method comprising:

using a communication unit of the mobile terminal to connect to an internet for accessing an external server;

using a browser of the mobile terminal to request, via the communication unit, retrieval of data from the external server, and receive the data from the external server, and interpret and display the received data;

using the browser to interpret a URI (Uniform Resource Identifier) which identifies an information processing of a service object from a plurality of service objects, each service object including an internal server having a facility for providing information processing, and requests, via a local gateway in the mobile terminal, the information processing of the service object identified by the URI;

using a local gateway manager of the local gateway to control the local gateway;

using a service object manager of the local gateway to hold information regarding a status of availability of said plurality of service objects;

using the local gateway to route the browser's request for the information processing to the service object to provide the information processing identified by the URI;

providing the requested information processing of the service object identified by the URI;

using a local gateway manager of the local gateway, in response to the request from the browser, to return information written in a mark-up description language to the browser as a result of the information processing of the service object identified by the URI; and using the browser to interpret and display the information written in the mark-up description language returned from the local gateway.

2. An information processing method according to claim 1, further comprising:

using the service object manager of the local gateway to collect information about the service objects currently available to provide information processing; and using the local gateway manager of the local gateway to ask for a list of usable services;

using the service object manager of the local gateway to create a list of the service objects currently available to provide information processing written in markup languages from the collected information; and using the local gateway manager of the local gateway to return, to the browser, the list of the service objects which are currently available to provide information processing.

3. A computer executable program stored on a non-transitory computer readable storage medium in a mobile terminal, said computer executable program causing data to be displayed on a display device of the mobile terminal, said computer executable program comprising:

computer executable program code operable to cause a communication unit in the mobile terminal to connect to an internet for accessing an external server, computer executable program code operable to cause a browser of the mobile terminal to request, via the communication unit, retrieval of data from the external server, and receive the data from the external server, and interpret and display the received data;

computer executable program code operable to cause the browser to interpret a URI (Uniform Resource Identifier) which identifies an information processing of a service object from a plurality of service objects, each service object including an internal server having a facility for providing information processing, and request, via a local gateway of the mobile terminal, the information processing of the service object identified by the URI;

computer executable program code operable to cause a local gateway manager of the local gateway to control the local gateway;

computer executable program code operable to cause a service object manager of the local gateway to hold information regarding a status of an availability of said plurality of service objects;

computer executable program code operable to cause the local gateway to route the browser's request for the information processing to the service object to provide the information processing identified by the URI;

computer executable program code operable cause the requested information processing of the service object identified by the URI;

computer executable program code operable to cause the local gateway, in response to the request from the browser, to return information written in a mark-up description language to the browser as a result of the information processing of the service object identified by the URI; and computer executable program code operable to cause the browser to interpret and display, on the display device, the information written in the mark-up description language returned from the local gateway.

4. A computer executable program stored embodied on a non-transitory computer readable storage medium according to claim 3, further comprising:

computer executable program code operable to cause the local gateway to collect information about the service objects which are currently available to provide information processing; and computer executable program code operable to cause the local gateway manager of the local gateway to ask for a list of usable services;

computer executable program code operable to cause the service object manager of the local gateway to create a list of the service objects currently available to provide information processing written in markup languages from the collected information; and computer executable program code operable to cause the local gateway to return, to the browser, the list of the service objects which are currently available to provide information processing.

5. An information processing method according to claim 1, further comprising:

using an ML creating part, included in each of the plurality of service objects, to create information written in the mark-up description language.

6. A computer executable program stored on a non-transitory computer readable storage medium according to claim 3, further comprising:

computer executable program code operable to cause an ML creating part, included in each of the plurality of service objects, to create information written in the mark-up description language.

7. An information processing method according to claim 2, further comprising:

using an ML creating part, included in the local gateway, to create a mark-up description of the list of available service objects, and using the browser to receive and display the mark-up description of the list of available service objects.

8. A computer executable program stored on a non-transitory computer readable storage medium according to claim 4, further comprising:

computer executable program code operable to cause an ML creating part, included in the local gateway, to create a mark-up description of the list of available service objects; and computer executable program code operable to cause the browser to receive and display the mark-up description of the list of available service objects.

9. An information processing method using an information processing terminal, the information processing terminal comprising:

a memory unit for storing application programs;

a Central Processing Unit operable to execute the application programs stored in said memory unit, and a communication unit operable to enable said information processing terminal to connect to an internet for accessing an external server;

the application programs including:

a plurality of service objects, each service object including an internal server having a facility for providing information processing;

a local gateway operable to communicate with the service objects; and a browser operable to request retrieval of data from the external server via said communication unit and operable to request the information processing of the internal server, via said local gateway, from a service object selected from said plurality of service objects;

wherein said browser is operable to interpret a URI (Uniform Resource Identifier) identifying an information processing of a service object from said plurality of service objects, and request, via said local gateway, the information processing of the service object identified by the URI and interpret and display information written in a mark-up description language returned as a response to the request; and said local gateway is operable to serve as an interface between said browser and each of said plurality of service objects, route the browser's request for the information processing to the service object to provide the information processing identified by the URI, and in response to the request from the browser, return information written in a mark-up description language to the browser as a result of the information processing of the service object identified by the URI;

said local gateway comprising:

a service object manager operable to hold information regarding a status of an availability of said plurality of service objects;

wherein said internal server corresponding to the selected service object is operable to execute the information processing specified by the request from the browser and the selected service object is operable to return local data to the browser, as a result of the information processing; and said browser is operable to receive data retrieved from the external server for display on said information processing terminal and is operable to receive the local data retrieved from the selected service object for display on said information processing terminal, the method comprising:

using a browser to interpret a URI (Uniform Resource Identifier) which identifies an information processing of a service object from said plurality of service objects, and request, via a local gateway, the information processing of the service object identified by the URI;

providing the requested information processing of the service object identified by the URI;

using the local gateway, in response to the request from the browser, to return information written in a mark-up description language to the browser as a result of the information processing of the service object identified by the URI; and using the browser to interpret and display the information written in the mark-up description language returned from the local gateway.

10. An information processing method according to claim 9, further comprising:

using the local gateway to collect information about the service objects currently available to provide information processing; and using the local gateway to return, to the browser, a list of the service objects which are currently available to provide information processing.

11. A computer executable program stored on a non-transitory computer readable storage medium, said computer executable program causing an information processing terminal to operate and data to be displayed on a display device, the information processing terminal comprising:

a memory unit for storing application programs;

a Central Processing Unit operable to execute the application programs stored in said memory unit, and a communication unit operable to enable said information processing terminal to connect to an internet for accessing an external server;

the application programs including:

a plurality of service objects, each service object including an internal server having a facility for providing information processing;

a local gateway operable to communicate with the service objects; and a browser operable to request retrieval of data from the external server via said communication unit and operable to request the information processing of the internal server, via said local gateway, from a service object selected from said plurality of service objects;

wherein said browser is operable to interpret a URI (Uniform Resource Identifier) identifying an information processing of a service object from said plurality of service objects, and request, via said local gateway, the information processing of the service object identified by the URI and interpret and display information written in a mark-up description language returned as a response to the request; and said local gateway is operable to serve as an interface between said browser and each of said plurality of service objects, route the browser's request for the information processing to the service object to provide the information processing identified by the URI, and in response to the request from the browser, return information written in a mark-up description language to the browser as a result of the information processing of the service object identified by the URI;

said local gateway comprising:

a service object manager operable to hold information regarding a status of an availability of said plurality of service objects;

wherein said internal server corresponding to the selected service object is operable to execute the information processing specified by the request from the browser and the selected service object is operable to return local data to the browser, as a result of the information processing; and said browser is operable to receive data retrieved from the external server for display on said information processing terminal and is operable to receive the local data retrieved from the selected service object for display on said information processing terminal, said computer executable program comprising:

computer executable program code operable to cause the browser to interpret a URI (Uniform Resource Identifier) which identifies an information processing of a service object from a plurality of service objects, and request, via a local gateway, the information processing of the service object identified by the URI;

computer executable program code operable cause the requested information processing of the service object identified by the URI;

computer executable program code operable to cause the local gateway, in response to the request from the browser, to return information written in a mark-up description language to the browser as a result of the information processing of the service object identified by the URI; and computer executable program code operable to cause the browser to interpret and display, on the display device, the information written in the mark-up description language returned from the local gateway.

12. A computer executable program stored on a non-transitory computer readable storage medium according to claim 11, further comprising:

computer executable program code operable to cause the local gateway to collect information about the service objects which are currently available to provide information processing; and computer executable program code operable to cause the local gateway to return, to the browser, a list of the service objects which are currently available to provide information processing.

13. An information processing method according to claim 9, further comprising:

using an ML creating part, included in each of the plurality of service objects, to create information written in the mark-up description language.

14. A computer executable program stored on a non-transitory computer readable storage medium according to claim 11, further comprising:

computer executable program code operable to cause an ML creating part, included in each of the plurality of service objects, to create information written in the mark-up description language.

15. An information processing method according to claim 9, further comprising:

using an ML creating part, included in the local gateway, to create a mark-up description of the list of available service objects, and using the browser to receive and display the mark-up description of the list of available service objects.

16. A computer executable program stored on a non-transitory computer readable storage medium according to claim 12, further comprising:

computer executable program code operable to cause an ML creating part, included in the local gateway, to create a mark-up description of the list of available service objects; and computer executable program code operable to cause the browser to receive and display the mark-up description of the list of available service objects.

* * * * *

UNITED STATES PATENT AND TRADEMARK OFFICE
CERTIFICATE OF CORRECTION

PATENT NO. : 8,239,484 B2
APPLICATION NO. : 12/610955
DATED : August 7, 2012
INVENTOR(S) : Takayama et al.

Page 1 of 1

It is certified that error appears in the above-identified patent and that said Letters Patent is hereby corrected as shown below:

On the title page of the issued patent item (62) Related U.S. Application Data delete "Division of application No. 11/808,838 filed June 13, 2007, now Pat. No. 7,627,647, which is a division of application No. 09/958,027 filed on January 7, 2002, now Pat. No. 7,246,152". and insert --Division of application No. 11/808,838 filed June 13, 2007, now Pat. No. 7,627,647, which is a division of application No. 09/958,027 filed as application No. PCT/JP01/00794 on February 9, 2001, now Pat. No. 7,246,152.--

Signed and Sealed this
Twenty-ninth Day of July, 2014

Michelle K. Lee
*Deputy Director of the United States Patent and Trademark Office*